(12) United States Patent
Lee et al.

(10) Patent No.: US 10,809,865 B2
(45) Date of Patent: Oct. 20, 2020

(54) ENGAGING PRESENTATION THROUGH FREEFORM SKETCHING

(71) Applicant: Microsoft Corporation, Redmond, WA (US)

(72) Inventors: Bongshin Lee, Issaquah, WA (US); Gregory R. Smith, Bellevue, WA (US); Kazi Rubaiat Habib, Singapore (SG)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/784,848

(22) Filed: Mar. 5, 2013

(65) Prior Publication Data

US 2014/0201682 A1    Jul. 17, 2014

Related U.S. Application Data

(60) Provisional application No. 61/752,928, filed on Jan. 15, 2013.

(51) Int. Cl.
*G06F 3/0481* (2013.01)
(52) U.S. Cl.
CPC ................................. *G06F 3/0481* (2013.01)
(58) Field of Classification Search
CPC .. G06F 3/0481; G06F 3/04817; G06F 3/0486; G06F 17/00; G06F 3/0488;
(Continued)

(56) References Cited

U.S. PATENT DOCUMENTS

| 5,880,743 | A |   | 3/1999 | Moran et al. |
| 6,038,522 | A | * | 3/2000 | Manson et al. ............... 702/150 |

(Continued)

FOREIGN PATENT DOCUMENTS

| CN | 101662521 A | 3/2010 |
| CN | 102707875 A | 10/2012 |

(Continued)

OTHER PUBLICATIONS

Browne et al. Data Analysis on Interactive Whiteboards through Sketch-based Interaction; Published date Nov. 2011 (Year: 2011).*

(Continued)

*Primary Examiner* — Daniel Samwel
(74) *Attorney, Agent, or Firm* — Medley, Behrens & Lewis, LLC

(57) ABSTRACT

Various technologies described herein pertain to presenting a graphical object on a display screen. An indication that specifies a selected value attribute from a dataset for the graphical object and an example icon for the graphical object can be received. The example icon is a cluster of strokes, where a stroke is a mark that is displayable on the display screen. The graphical object is generated based upon the example icon and data for the selected value attribute from the dataset. The graphical object includes instances of the example icon respectively modified based upon the data for the selected value attribute from the dataset. The graphical object can be caused to be displayed on the display screen. Creation of strokes of the instances of the example icon included in the graphical object can be recorded for subsequent replay. The graphical object can be annotated and/or modified by filtering the data.

20 Claims, 19 Drawing Sheets

(58) Field of Classification Search
CPC .. G06F 3/0487; G06F 3/03545; G06F 17/211; G06F 17/21; G06F 17/20; G06Q 99/00; H04L 65/403; Y10S 707/00; Y10S 707/99931; G06K 9/00463; G06N 5/02; G06N 5/04
USPC .................................................. 715/700–866
See application file for complete search history.

(56) References Cited

U.S. PATENT DOCUMENTS

| | | | |
|---|---|---|---|
| 6,459,442 | B1 | 10/2002 | Edwards et al. |
| 6,952,803 | B1* | 10/2005 | Bloomberg et al. .......... 715/236 |
| 7,096,454 | B2 | 8/2006 | Damm et al. |
| 7,158,138 | B1* | 1/2007 | Bronskill et al. ............. 345/441 |
| 7,515,752 | B2 | 4/2009 | Tremblay et al. |
| 7,788,606 | B2 | 8/2010 | Patel et al. |
| 8,082,274 | B2 | 12/2011 | Steinglass et al. |
| 8,290,888 | B1 | 10/2012 | Heidenreich et al. |
| 8,994,732 | B2 | 3/2015 | Lee et al. |
| 9,665,259 | B2 | 5/2017 | Lee et al. |
| 2002/0033825 | A1 | 3/2002 | Satake et al. ................. 345/473 |
| 2003/0154443 | A1* | 8/2003 | Papierniak ............ G06T 11/206 715/211 |
| 2004/0060037 | A1 | 3/2004 | Damm et al. |
| 2005/0248560 | A1 | 11/2005 | Agrawala et al. |
| 2005/0275622 | A1* | 12/2005 | Patel .................. G06F 3/04883 345/156 |
| 2006/0045343 | A1 | 3/2006 | Tremblay et al. |
| 2008/0109740 | A1* | 5/2008 | Prinsen et al. ................ 715/764 |
| 2008/0159625 | A1* | 7/2008 | Bhaskarabhatla ......................... G06K 9/00409 382/179 |
| 2008/0192056 | A1 | 8/2008 | Robertson et al. |
| 2008/0215496 | A1* | 9/2008 | Hockley ................ G06Q 40/02 705/36 R |
| 2008/0231926 | A1 | 9/2008 | Klug et al. |
| 2008/0301571 | A1* | 12/2008 | Herzog ......................... 715/764 |
| 2009/0278848 | A1 | 11/2009 | Robertson et al. |
| 2010/0031203 | A1 | 2/2010 | Morris et al. |
| 2010/0050133 | A1 | 2/2010 | Nishihara et al. |
| 2010/0058201 | A1 | 3/2010 | Harvey et al. |
| 2010/0188409 | A1* | 7/2010 | Ooba .................... G06F 3/0488 345/473 |
| 2010/0325564 | A1 | 12/2010 | Mital et al. |
| 2011/0175916 | A1 | 7/2011 | Noris et al. |
| 2011/0181774 | A1* | 7/2011 | Masuda .................. G06T 13/80 348/473 |
| 2011/0214044 | A1* | 9/2011 | Davis et al. .................. 715/201 |
| 2011/0249024 | A1 | 10/2011 | Arrasvuori et al. |
| 2011/0261060 | A1* | 10/2011 | Waibel .................... G06T 13/80 345/473 |
| 2011/0314113 | A1* | 12/2011 | Noda .................... G06F 3/0481 709/206 |
| 2012/0011465 | A1 | 1/2012 | Rezende |
| 2012/0154403 | A1* | 6/2012 | Mital .................... G06T 11/206 345/440 |
| 2012/0229468 | A1 | 9/2012 | Lee et al. |
| 2012/0229470 | A1* | 9/2012 | Nagai ................. G06F 3/04883 345/440 |
| 2012/0330853 | A1* | 12/2012 | Forbes et al. .................. 705/319 |
| 2013/0047093 | A1 | 2/2013 | Reuschel et al. |
| 2013/0222385 | A1* | 8/2013 | Dorsey .................. G06T 11/20 345/427 |
| 2013/0335426 | A1* | 12/2013 | Noris ...................... G06T 13/00 345/473 |
| 2014/0053091 | A1* | 2/2014 | Hou .................. G06F 17/30389 715/769 |
| 2015/0015504 | A1 | 1/2015 | Lee et al. |

FOREIGN PATENT DOCUMENTS

| | | |
|---|---|---|
| CN | 102812455 A | 12/2012 |
| EP | 0865003 A2 | 9/1998 |

OTHER PUBLICATIONS

Lee et al. SketchStory: Telling More Engaging Stories with Data through Freeform Sketching; Published date Oct. 13, 2013 (Year: 2013).*

Bae, et al., "ILoveSketch: As-Natural-As-Possible Sketching System for Creating 3D Curve Models", Retrieved at <<http://citeseerx.ist.psu.edu/viewdoc/download;jsessionid=81463454828325BE03D56AA5FB781A72?doi=10.1.1.139.3049&rep=rep1&type=pdf>>, In Proceedings of the 21st Annual ACM Symposium on User Interface Software and Technology, Oct. 19, 2008, pp. 151-160.

Bateman, et al., "Useful Junk? The Effects of Visual Embellishment on Comprehension and Memorability of Charts", Retrieved at <<http://dmrussell.net/CHI2010/docs/p2573.pdf>>, In Proceedings of the SIGCHI Conference on Human Factors in Computing Systems, Apr. 10, 2010, pp. 2573-2582.

Bott, et al., "A Pen-Based Tool for Visualizing Vector Mathematics", Retrieved at <<http://www.eecs.ucf.edu/~jjl/pubs/vectorpad.pdf>>, In Proceedings of the Seventh Sketch-Based Interfaces and Modeling Symposium, Jun. 7, 2010, pp. 1-8.

Browne, et al., "Data Analysis on Interactive Whiteboards through Sketch-based Interaction", Retrieved at <<http://research.microsoft.com/en-us/um/people/nath/docs/isketchvis_its2011.pdf>>, In Proceedings of the ACM International Conference on Interactive Tabletops and Surfaces, Nov. 13, 2011, pp. 1-4.

Chao, et al., "Poster: Rapid Pen-Centric Authoring of Improvisational Visualizations with NapkinVis", Retrieved at <<http://www.cs.ubc.ca/~wochao/napkinvis/SummaryNapkinVis.pdf>>, In Proceedings of IEEE Information Visualization Conference, Oct. 24, 2010, pp. 1-2.

Davis, et al., "K-Sketch: A 'Kinetic' Sketch Pad for Novice Animators", Retrieved at <<http://citeseerx.ist.psu.edu/viewdoc/download;jsessionid=7D00E437823D8C7A6420DDA9E1A71142?doi=10.1.1.134.2232&rep=rep1&type=pdf>>, In Proceedings of the Twenty-sixth Annual SIGCHI Conference on Human Factors in Computing Systems, Apr. 5, 2008, pp. 1-10.

Eccles, et al., "Stories in GeoTime", Retrieved at <<http://ieeexplore.ieee.org/stamp/stamp.jsp?tp=&arnumber=4388992>>, In IEEE Symposium on Visual Analytics Science and Technology, Oct. 30, 2007, pp. 19-26.

Gershon, et al., "What Storytelling Can Do for Information Visualization", Retrieved at <<http://cs.smith.edu/classwiki/images/c/c2/StorytellingForInformationVisualization.pdf>>, In Proceedings of Communications of the ACM, vol. 44, Issue 8, Aug. 2001, pp. 31-37.

Gross, et al., "Ambiguous Intentions: A Paper-like Interface for Creative Design", Retrieved at <<https://wiki.cc.gatech.edu/designcomp/images/archive/e/e4/20110701215646!Uist96-ambiguous.pdf>>, In Proceedings of ACM Conference on User Interface Software Technology, Nov. 6, 1996, pp. 1-11.

Hearst, Marti A., "Sketching Intelligent Systems", Retrieved at <<http://citeseerx.ist.psu.edu/viewdoc/download?doi=10.1.1.42.853&rep=rep1&type=pdf>>, In IEEE Intelligent Systems and their Applications, vol. 13, Issue 3, May 1998, pp. 10-19.

Heer, et al., "Graphical Histories for Visualization: Supporting Analysis, Communication, and Evaluation", Retrieved at <<http://vis.berkeley.edu/papers/graphical_histories/2008-GraphicalHistories-InfoVis.pdf>>, In Journal of IEEE Transactions on Visualization and Computer Graphics, vol. 14, Issue 6, 2008, pp. 1-8.

Heer, et al., "Voyager and Voyeurs: Supporting Asynchronous Collaborative Information Visualization", Retrieved at <<http://citeseerx.ist.psu.edu/viewdoc/download?doi=10.1.1.83.678&rep=rep1&type=pdf>>, In Proceedings of the SIGCHI Conference on Human Factors in Computing Systems, Apr. 28, 2007, pp. 1-10.

Hinckley, et al., "Pen + Touch = New Tools", Retrieved at <<http://citeseerx.ist.psu.edu/viewdoc/download?doi=10.1.1.186.5683&rep=rep1&type=pdf>>, In Proceedings of the 23nd Annual ACM Symposium on User Interface Software and Technology, Oct. 3, 2010, pp. 27-36.

Igarashi, et al., "Teddy: A Sketching Interface for 3D Freeform Design", Retrieved at <<http://www.cc.gatech.edu/~jarek/graphics/

(56) References Cited

OTHER PUBLICATIONS papers/07TeddyIgarashi.pdf>>, In Proceedings of the 26th Annual Conference on Computer Graphics and Interactive Techniques, Aug. 1999, pp. 409-416.

Kazi, et al., "SandCanvas: A Multi-touch Art Medium Inspired by Sand Animation", Retrieved at <<http://www.mysmu.edu/faculty/rcdavis/pubs/2011-CHI-SandCanvas.pdf>>, In Proceedings of the SIGCHI Conference on Human Factors in Computing Systems, May 7, 2011, pp. 1-10.

Kazi, et al., "Vignette: Interactive Texture Design and Manipulation with Freeform Gestures for Pen-and-Ink Illustration", Retrieved at <<http://sketchvignette.files.wordpress.com/2012/01/vignettechi2012.pdf>>, In Proceedings of the SIGCHI Conference on Human Factors in Computing Systems, May 7, 2011, pp. 1-10.

Keim, Daniel A., "Information Visualization and Visual Data Mining", Retrieved at <<http://nm.merz-akademie.de/~jasmin.sipahi/drittes/images/Keim2002.pdf>>, In IEEE Transactions on Visualization and Computer Graphics, vol. 7, Issue 1, Jan. 2002, pp. 100-107.

"Khan Academy", Retrieved at <<http://www.khanacademy.org/>>, Retrieved Date: Dec. 19, 2012, pp. 1-3.

Landay, et al., "Interactive Sketching for the Early Stages of User Interface Design", Retrieved at <<http://citeseerx.ist.psu.edu/viewdoc/download?doi=10.1.1.30.8570&rep=rep1&type=pdf>>, In Proceedings of the SIGCHI Conference on Human Factors in Computing Systems, May 7, 1995, pp. 1-9.

Laviola Jr., et al., "MathPad2: A System for the Creation and Exploration of Mathematical Sketches", Retrieved at <<http://www.cs.uml.edu/~holly/teaching/91550/spring2011/LaViola-Jr-2004.pdf>>, In Journal of ACM Transactions on Graphics (TOG)—Proceedings of ACM SIGGRAPH, Aug. 2007, pp. 432-440.

Li, et al., "SketchComm: A Tool to Support Rich and Flexible Asynchronous Communication of Early Design Ideas", Retrieved at <<http://research.microsoft.com/en-us/people/xiangc/cscw2012_sketchcomm.pdf>>, In Proceedings of the ACM Conference on Computer Supported Cooperative Work, Feb. 11, 2012, pp. 359-368.

Lin, et al., "DENIM: An Informal Tool for Early Stage Web Site Design", Retrieved at <<http://citeseerx.ist.psu.edu/viewdoc/download?doi=10.1.1.17.7475&rep=rep1&type=pdf>>, In Proceedings of Extended Abstracts of Human Factors in Computing Systems, Mar. 31, 2001, pp. 1-2.

Baldonado, et al., "Guidelines for Using Multiple Views in Information Visualization", Retrieved at <<http://www.cs.ubc.ca/~tmm/courses/cpsc533c-04-spr/morereadings/baldonado.pdf>>, In Proceedings of the Working Conference on Advanced Visual Interfaces, May 23, 2000, pp. 1-10.

"Perceptive Pixel", Retrieved at <<http://www.perceptivepixel.com/>>, Retrieved Date: Mar. 4, 2013, p. 1.

Barringer, Matt, "Powering the Earth", Retrieved at <<http://edition.cnn.com/SPECIALS/2009/environment/energy/>>, Retrieved Date : Dec. 19, 2012, pp. 1-2.

"RSAanimate: Ideas and Actions for 21st Century Enlightment", Retrieved at <<http://www.thersa.org/>>, Retrieved Date : Dec. 19, 2012, pp. 1-2.

Ryall, et al., "QueryLines: Approximate Query for Visual Browsing", Retrieved at <<http://www.merl.com/papers/docs/TR2005-015.pdf>>, In Proceedings of Extended Abstracts of the Conference on Human Factors in Computing Systems, Apr. 2, 2005, pp. 1-6.

Segel, et al., "Narrative Visualization: Telling Stories with Data", Retrieved at <<http://vis.stanford.edu/files/2010-Narrative-InfoVis.pdf>>, In Journal of IEEE Transactions on Visualization and Computer Graphics, vol. 16, Issue 6, 2010, pp. 1-10.

Sutherland, Ivan Edward, "Sketchpad: A Man-machine Graphical Communication System", Retrieved at <<http://dcom.arch.gatech.edu/class/COA8672/Readings/history/Sketchpad-sutherland.pdf>>, In Proceedings of the AFIPS Spring Joint Computer Conference, May 21, 1963, pp. 329-346.

"Tableau Public", Retrieved at <<http://tableausoftware.com/public>>, Retrieved Date: Dec. 20, 2012, p. 1.

Tohidi, et al., "Getting the Right Design and the Design Right: Testing Many Is Better Than One", Retrieved at <<http://research.microsoft.com/en-us/um/people/asellen/publications/p1243-tohidi.pdf>>, In Proceedings of the SIGCHI Conference on Human Factors in Computing Systems, Apr. 22, 2006, pp. 1243-1252.

Viegas, et al., "Digital Artifacts for Remembering and Storytelling: PostHistory and Social Network Fragments", Retrieved at <<http://ieeexplore.ieee.org/stamp/stamp.jsp?tp=&arnumber=1265287>>, In Proceedings of the 37th Annual Hawaii International Conference on System Sciences, Jan. 5, 2004, pp. 1-10.

Viegas, et al., "ManyEyes: A Site for Visualization at Internet Scale", Retrieved at <<http://ieeexplore.ieee.org/stamp/stamp.jsp?tp=&arnumber=4376131>>, In IEEE Transactions on Visualization and Computer Graphics, vol. 13, Issue: 6, Nov. 2007, pp. 1121-1128.

Wattenberg, Martin, "Sketching a Graph to Query a Time-Series Database", Retrieved at <<http://citeseerx.ist.psu.edu/viewdoc/download?doi=10.1.1.87.6854&rep=rep1&type=pdf>>, In Extended Abstracts on Human Factors in Computing Systems, Mar. 31, 2001, pp. 1-3.

Williamson, et al., "The Dynamic HomeFinder: Evaluating Dynamic Queries in a Real-Estate Information Exploration System", Retrieved at <<http://www.cs.umd.edu/~ben/papers/Williamson1992dynamic.pdf>>, In Proceedings of the 15th Annual International ACM SIGIR Conference on Research and Development in Information Retrieval, Jun. 21, 1992, pp. 338-346.

Wojtkowski, et al., "Storytelling: Its Role in Information Visualization", Retrieved at <<http://citeseerx.ist.psu.edu/viewdoc/download?doi=10.1.1.99.4771&rep=rep1&type=pdf>>, In European Systems Science Congress, Oct. 2002, pp. 1-5.

Sullivan, et al., "Social-technical tools for collaborative sensemaking and sketching", Retrieved at <<http://citeseerx.ist.psu.edu/viewdoc/download?doi=10.1.1.180.1373&rep=rep1&type=pdf>>, 13th International Conference, Human-Computer Interaction, Part IV, Jul. 19, 2009, pp. 1-10.

Igarashi, Takeo, "Freeform User Interfaces for Graphical Computing", Retrieved at <<http://133.11.9.3/~takeo/papers/dissertation.pdf>>, A doctoral dissertation submitted to Graduate School of Information Engineering at the University of Tokyo, Dec. 1999, pp. 1-157.

Walny, et al., "Understanding Pen and Touch Interaction for Data Exploration on Interactive Whiteboards", Retrieved at <<http://research.microsoft.com/en-us/um/redmond/groups/cue/publications/TVCG2012-SketchInsight.pdf>>, In IEEE Transactions on Visualization and Computer Graphics, vol. 18, Oct. 14, 2012, pp. 1-10.

"Response to International Search Report (ISR) and Written Opinion for PCT Patent Application No. PCT/US2014/011369", Filed Date: Jul. 17, 2014, 3 Pages.

"International Search Report & Written Opinion for PCT Patent Application No. PCT/US2014/011369", dated Apr. 9, 2014, Filed Date: Jan. 14, 2014, 10 Pages.

"Written Opinion for PCT Patent Application No. PCT/US2014/011369", dated Jan. 20, 2015, 12 Pages.

"International Preliminary Report on Patentability for PCT Patent Application No. PCT/US2014/011369", dated May 4, 2015, 13 pages.

"Communication Pursuant to Rules 161(1) and 162 EPC for European Patent Application No. 14704417.6", dated Sep. 15, 2015, 2 pages.

"Response to the Communication Pursuant to Rules 161(1) and 162 EPC for European Patent Application No. 14704417.6", Filed Date: Oct. 20, 2015, 18 pages.

"Voluntary Claim Amendments for Chinese Patent Application No. 2014800049374", Filed Date: Mar. 9, 2016, 13 pages.

"Office Action and Search Report Issued in Taiwanese Patent Application No. 103101469", dated Feb. 18, 2017, 10 Pages.

"First Office Action and Search Report Issued in Chinese Patent Application No. 201480004937.4", dated Nov. 1, 2017, 15 Pages.

Shneiderman, Ben, "Direct Manipulation: A Step Beyond Programming Languages", In ACM SIGSOC Bulletin, vol. 3, No. 2-3, Aug. 1983, pp. 57-69.

(56) References Cited

OTHER PUBLICATIONS

Strothotte, et al., "Non-Photorealistic Computer Graphics: Modeling, Rendering, and Animation", In the Morgan Kaufmann Series in Computer Graphics, Apr. 26, 2002, 496 Pages.
Tenneson, Dana, "ChemPad: A Pedagogical Tool for Exploring Handwritten Organic Molecules", Retrieved from http://graphics.cs.brown.edu/research/chempad/chempadpaper05.pdf, May 2005, 7 Pages.
Vvood, et al., "Sketchy Rendering for Information Visualization", In Proceedings of the IEEE Transactions on Visualization and Computer Graphics, vol. 18, No. 12, Dec. 2012, pp. 2749-2758.
Walker, Maximilian, "Information Visualization beyond Mouse and Keyboard", In the Technical Report, LMU-MI-2013-1, Apr. 2013, 16 Pages.
Walny, et al., "Towards Supporting Interactive Sketch-Based Visualizations", In the Draft Submitted to Thinking through Drawing Workshop, Aug. 2012, 12 Pages.
Wobbrock, et al., "User-Defined Gestures for Surface Computing", In Proceedings of the SIGCHI Conference on Human Factors in Computing Systems, Apr. 4, 2009, 10 Pages.
Zeleznik, et al., "Fluid Inking: Augmenting the Medium of Free-Form Inking with Gestures", In Proceedings of Graphics Interface, Jun. 7, 2006, 8 Pages.
"Data Analysis Software and Tools", Retrieved from http://www.informationbuilders.com/data-analysis.html, Retrieved Date: Oct. 19, 2010, 3 Pages.
"Data Visualization—Good Way to Present Data in Descriptive Way", Retrieved from http://www.buzzle.com/articles/data-visualization-good-way-to-present-data-in-descriptive-way.html, Retrieved Date: Oct. 18, 2010, 2 Pages.
"Functions & Data Analysis Tools", Retrieved from http://web.archive.org/web/20060901132303/http://www.techdocs.ku.edu/docs/excel_2000_functions.pdf, 2003, 18 Pages.
"Microsoft Excel 2010", Retrieved from http://web.archive.org/web/20101019035328/http://office.microsoft.com/en-us/excel/, Retrieved Date: Oct. 19, 2010, 2 Pages.
"Our Approach: Key Engagement Attributes", Retrieved from http://ideation816.com/About/OurApproach, Retrieved Date: Jul. 10, 2013, 1 Page.
"PowerPoint Presentation and Slide Sollware—Office.com", Retrieved from http://web.archive.org/web/20130113011100/http://office.microsoft.com/en-us/powerpoint/, Retrieved Date: Jan. 13, 2013, 1 Page.
"Tableau", Retrieved from http://www.tableau.com, Retrieved Date: Oct. 19, 2010, 1 Page.
"The World Bank", Retrieved from http://data.worldbank.org, Retrieved Date: Jan. 13, 2013, 2 Pages.
"Top 7 IT Certifications, Info Graphics Mania", Retrieved from http://web.archive.org/web/20130725051511/http://infographicsmania.com/top-7-it-certifications, Retrieved Date: Jul. 10, 2013, 6 Pages.
"Women in the Boardroom [Infographic]—Infographic List", Retrieved from http://web.archive.org/web/20130703211015/http://infographiclist.com/2012/01/18/women-in-the-boardroom-infographic, Jan. 18, 2012, 4 Pages.
"Final Office Action Issued in U.S. Appl. No. 13/042,415", dated Jul. 15, 2014, 17 Pages.
"Final Office Action Issued in U.S. Appl. No. 13/042,415", dated Aug. 27, 2013, 21 Pages.
"Non Final Office Action Issued in U.S. Appl. No. 13/042,415", dated Mar. 22, 2013, 21 Pages.
"Non Final Office Action Issued in U.S. Appl. No. 13/042,415", dated Feb. 19, 2014, 22 Pages.
"Final Office Action Issued in U.S. Appl. No. 14/302,249", dated Feb. 10, 2016, 12 Pages.
"Non Final Office Action Issued in U.S. Appl. No. 14/302,249", dated Aug. 9, 2016, 11 Pages.
"Non Final Office Action Issued in U.S. Appl. No. 14/302,249", dated Jul. 6, 2015, 9 Pages.
"Office Action Issued in European Patent Application No. 14704417.6", dated Jul. 17, 2018, 7 Pages.
"First Office Action Issued in Chinese Patent Application No. 201210057445.4", dated Feb. 4, 2016, 13 Pages.
"Second Office Action Issued in Chinese Patent Application No. 201210057445.4", dated Aug. 3, 2016, 7 Pages.
"Second Office Action Issued in Chinese Patent Application No. 201480004937.4", dated Jul. 2, 2018, 6 Pages.
"Office Action Issued in Chinese Patent Application No. 201480039819.7", dated Dec. 4, 2017, 8 Pages.
"Engaging Presentation Through reeform Sketching", U.S. Appl. No. 61/752,928, filed Jan. 15, 2013, 43 Pages.
Apitz, et al., "CrossY: A Crossing-Based Drawing Application", In Proceedings of the 17th Annual ACM Symposium on User Interface Software and Technology, Oct. 24-27, 2004, 10 Pages.
Brandl, et al., "Combining and Measuring the Benefits of Bimanual Pen and Direct-Touch Interaction on Horizontal Interfaces", In Proceedings of the Working Conference on Advanced Visual Interfaces, May 28, 2008, 8 Pages.
Browne, et al., "iSketchVis: Intgrating Sketch-Based Interaction with Computer Supported Data Analysis", In Proceedings of the 6th Annual Graduate Student Workshop on Computing, Oct. 7, 2011, pp. 25-26.
Buxton, Bill, "Sketching User Experiences: Getting the Design Right and the Right Design", In Book on Sketching User Experiences: Getting the Design Right and the Right Design, 1st Edition, 445 Pages.
Cheema, et al., "QuickDraw: Improving Drawing Experience for Geometric Diagrams", In Proceedings of the SIGCHI Conference on Human Factors in Computing Systems, May 5, 2012, 10 Pages.
Dean, Brian C . . . , "Beyond Screen Capture: Creating Effective Multimedia Whiteboard Lectures on a Tablet PC", In Proceedings Annual Workshop on the Impact of Pen Technology in Education, 2006, 5 Pages.
Few, Stephen, "The Chartjunk Debate: A Close Examination of Recent Findings", In Visual Business Intelligent Newsletter, Apr., May and Jun. 2011, 11 Pages.
Frisch, et al., "Investigating Multi-Touch and Pen Gestures for Diagram Editing on Interactive Surfaces", In Proceedings of the ACM International Conference on Interactive Tabletops and Surfaces, Nov. 23, 2009, 8 Pages.
Halper, et al., "Psychology and Non-Photorealistic Rendering: The Beginning of a Beautiful Relationship", In Mensch & Computer 2003, 2003, 11 Pages.
Hsu, Jeremy, "The Secrets of Storytelling", In Scientific American Mind, vol. 19, No. 4, Aug. 2008, 6 Pages.
Kara, et al., "SimUSketch: A Sketchbased Interface for Simulink", In Proceedings of the Working Conference on Advanced Visual Interfaces, May 25-28, 2004, 4 Pages.
Kin, et al., "Eden: A Professional Multitouch Tool for Constructing Virtual Organic Environments", In Proceedings of the SIGCHI Conference on Human Factors in Computing Systems, May 7, 2011, pp. 1343-1352.
Lai, et al. "As Sketchy as Possible: Application Programming Interface (API) for Sketch-Based User nterface Understanding", In Proceedings of the International Symposium on Information Technology, vol. 1, 2010, 6 Pages.
Morris, et al., "Cooperative Gestures: Multi-User Gestural Interactions for Co-Located Groupware", In Proceedings of the SIGCHI Conference on Human Factors in Computing Systems, Apr. 22, 2006, 10 Pages.
Mynatt, et al., "Flatland: New Dimensions in Office Whiteboards", In Proceedings of the SIGCHI Conference on Humar Factors in Computing Systems, May 1, 1999, 8 Pages.
Olsen, et al., "A Taxonomy of Modeling Techniques using Sketch-Based Interfaces", In EUROGRAPHICS State of the Art Report, 2008, 19 Pages.
Paul, Annie Murphy., "Your Brain on Fiction", In the New York Times, Mar. 17, 2012, 4 Pages.
"International Preliminary Report on Patentability Issued in PCT Application No. PCT/US2014/045448", dated Sep. 29, 2015, 9 Pages.
"International Search Report and Written Opinion Issued in PCT Application No. PCT/US2014/045448", dated Oct. 2, 2014, 10 Pages.

(56) References Cited

OTHER PUBLICATIONS

"Second Written Opinion Issued in PCT Application No. PCT/US2014/045448", dated Jul. 1, 2015, 7 Pages.

Pederson, et al., "Tivoli: An Electronic Whiteboard for Informal Workgroup Meetings", In Proceedings of the Interact'93 and CHI'93 Conference on Human Factors in Computing Systems, 1993, 11 Pages.

Roam, Dan, "The Back of the Napkin (Expanded Edition): Solving Problems and Selling Ideas with Pictures", Penguin Group, Inc., 286 Pages.

Schumann, et al., "Assessing the Effect of Non-Photorealistic Rendered Images in CAD", In Proceedings of the SIGCHI Conference on Human Factors in Computing Systems, Apr. 13-18, 1996, 7 Pages.

Sezgin, et al., "Sketch Based Interfaces: Early Processing for Sketch Understanding", In Master's Thesis, Massachusetts Institute of Technology, 2001, 8 Pages.

"Office Action Issued in Korean Patent Application No. 10-2016-7000633", dated Jul. 13, 2020, 6 pages.

"Office Action Issued in Indian Patent Application No. 201647000225", dated Jul. 3, 2020, 7 pages.

* cited by examiner

ENGAGING PRESENTATION THROUGH FREEFORM SKETCHING

CROSS-REFERENCE TO RELATED APPLICATION

This application claims priority to U.S. Provisional Patent Application No. 61/752,928, filed on Jan. 15, 2013, and entitled "ENGAGING PRESENTATION THROUGH FREEFORM SKETCHING", the entirety of which is incorporated herein by reference.

BACKGROUND

Information visualization pertains to using visually presented information to gain insight to expose underlying patterns and unlock relationships between bits of data that otherwise would be hidden in complexity or raw quantity. The information visualization research community has produced various systems and techniques over the last several decades to enable exploration of data and facilitate gaining such insight visually. Less well researched is the actual communicative act embodied in presenting visual information to other people, though such presentation is often an end goal in an information exploration task. For example, customized graphical representations of information are commonly used by reporters, researchers, and statisticians for conveying conceptual information to audiences. These representations can include charts (e.g., bar chart, line chart, etc.) drawn with customized icons specifically designed to quickly and clearly communicate complex information. Often created with sophisticated graphical tools, these information visualizations can be both aesthetically pleasing and expressive. However, such visualizations typically can be static, missing out on a full breath of communicative power available to a live storyteller.

Another common technique involves whiteboard animation, also known as video scribing. Whiteboard animation is a visual communication technique where a presenter can produce a sequence of dynamic sketches along with synchronized narration to vividly communicate a story. Due to its innovative and expressive graphical style, whiteboard animation has increasingly attracted audiences and artistically inclined presenters, and has become more popular in domains such as advertising and education. However, producing high-quality whiteboard animation is time-consuming and potentially expensive. Moreover, its power to communicate with data is limited by relying on a presenter's numeric and artistic ability to formulate and present the underlying numbers in a visually compelling manner during a live performance.

SUMMARY

Described herein are various technologies that pertain to presenting a graphical object on a display screen. An indication that specifies a selected value attribute from a dataset for the graphical object and an example icon for the graphical object can be received. The example icon is a cluster of strokes, where a stroke is a mark that is displayable on the display screen. The graphical object can be generated based upon the example icon and data for the selected value attribute from the dataset. Further, the graphical object can include instances of the example icon respectively modified based upon the data for the selected value attribute from the dataset. The graphical object can be caused to be displayed on the display screen. Moreover, creation of strokes of the instances of the example icon included in the graphical object can be recorded as part of a prepared presentation for subsequent replay. The graphical object can further be annotated, modified by filtering the data for the selected value attribute from the dataset, a combination thereof, etc.

In accordance with various aspects, a presentation system can support creation of personalized and expressive graphical objects (e.g., data charts, maps, etc.). For example, a user can sketch an example icon for a graphical object, and the presentation system can automatically complete the graphical object by synthesizing the example icon based upon data from the dataset. Moreover, the presentation system allows the user to interact with the graphical objects. Further, the presentation system can support recording and playing back prepared presentations.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
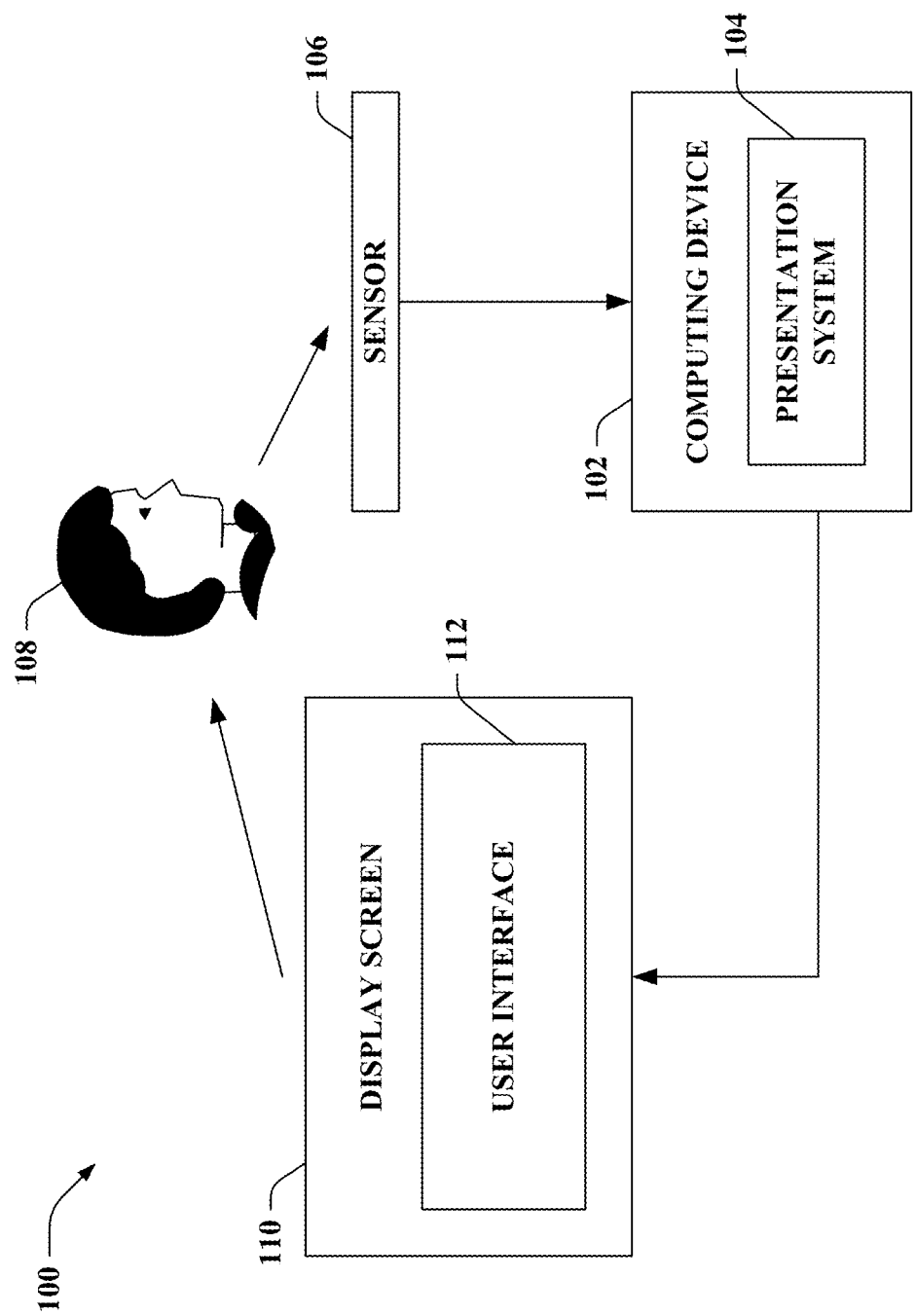
FIG. 1 illustrates a functional block diagram of an exemplary system that facilitates generating a freeform sketch-based presentation and/or rendering such presentation on a display screen.

Various technologies pertaining to creating a presentation that includes graphical object(s) automatically created from freeform sketches are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, various techniques support creation of personalized and expressive graphical objects (e.g., data charts, maps, etc.). A user can sketch an example icon, and a presentation system can automatically complete a graphical object by synthesizing the example icon based upon data from a dataset. Moreover, the presentation system allows the user to interact with the graphical objects. Further, the presentation system can support recording and playing back prepared presentations. During playback, the prepared presentation can be replayed as recorded and/or altered during replay (e.g., by a user when delivering the prepared presentation); thus, a sequence of steps can be recorded, and the steps in the sequence can be executed in order during replay, additional step(s) can be added into the sequence during replay, step(s) can be removed from the sequence during replay, and/or step(s) of the sequence can be modified during replay. The presentation system can leverage the expressiveness and freeform nature of sketch for creation of interactive and organic graphical objects for data presentation and narrative storytelling with data.

Referring now to the drawings, FIG. 1 illustrates a system 100 that facilitates generating a freeform sketch-based presentation and/or rendering such presentation on a display screen 110. The system 100 includes a computing device 102, which further comprises a presentation system 104. The system 100 also includes a sensor 106 that is configured to receive input data from a user 108. The user 108 can utilize substantially any input apparatus, where the sensor 106 is configured to sense movement and/or position of such input apparatus. Examples of the input apparatus that can be employed by the user 108 include, but are not limited to, a finger (or fingers) of the user 108, a hand (or hands) of the user 108, an interactive whiteboard pen (referred to herein as a pen), a stylus, a combination thereof, and so forth.

The sensor 106 can output data that is indicative of the movement and/or position of the input apparatus, and such data can be received by the computing device 102. The display screen 110 can be in communication with the computing device 102, such that the computing device 102 can cause the display screen 110 to display a user interface 112. More particularly, the presentation system 104 can be configured to cause the display screen 110 to display the user interface 112. The user interface 112 can include a graphical depiction of a canvas along with graphical object(s) (e.g., chart(s), map(s), etc.), annotation(s), multimedia content, etc., which can be displayed on the display screen 110. Further, the presentation system 104 can animate creation and/or manipulation of such visual elements included in the user interface 112 displayed on the display screen 110.

It is contemplated that the sensor 106 can be substantially any type of sensor that can accept input from the user 108. For example, the sensor 106 can be a gesture enabled trackpad, touch sensitive display screen (e.g., the sensor 106 can be integrated into the display screen 110), mouse, camera, microphone, remote control, keyboard, combination thereof, or the like. According to various examples, it is contemplated that the sensor 106 can rely on speech recognition, touch and stylus recognition, gesture recognition both on the display screen 110 and adjacent to the display screen 110, air gestures, head and eye tracking, voice and speech, vision, touch, gestures, and the like. Moreover, the sensor 106 can be configured to output data that indicates position and/or movement. The output data can be utilized by the presentation system 104, which can cause modification of the user interface 112 displayed on the display screen 110 which is reflective of the intent of the user 108.

In accordance with an example, the sensor 106 can be a gesture enabled trackpad. Following this example, the gesture enabled trackpad can output data that indicates position and/or movement of a finger (or fingers) of the user 108. The presentation system 104 can obtain such data and cause the user interface 112 displayed on the display screen 110 to be modified.

By way of another example, the sensor 106 can be a mouse. Following this example, through movement of the mouse and selection of one or more buttons on the mouse, the user 108 can cause the mouse to output data that is indicative of a user input. The presentation system 104 can receive such data and can cause modification of the user interface 112 displayed on the display screen 110.

According to a further example, the sensor 106 can be integrated into the display screen 110; following this example, the display screen 110 can be an interactive display screen. For instance, the interactive display screen can be a digital whiteboard, an interactive display surface, touch surface, pen-based surface, or the like. The user 108 can move his finger (or fingers) or pen over the display screen 110 as if the user 108 was drawing on a canvas. The presentation system 104 can cause the user interface 112 displayed on the display screen 110 to be updated based at least in part upon sensed movement of the finger (or fingers) of the user 108 or pen utilized by the user 108 over the display screen 110.

According to many of the examples set forth herein, the user 108 can utilize a pen touch on the display screen 110 (e.g., interactive display screen) to draw and a finger touch on the display screen 110 to manipulate visual elements included in the user interface 112 displayed on the display screen 110. The presentation system 104 can distinguish the role between pen and finger interactions to mitigate having explicit modes for graphical object creation and manipulation; thus, the presentation system 104 can enable using the pen for drawing graphical objects, annotations, or the like and finger touch for manipulating such visual elements. Thus, for instance, the presenter can move, select, etc. visual elements (e.g., graphical objects, selected group of strokes, etc.) with touch without explicitly changing a mode. It is contemplated, however, that the claimed subject matter is not limited to the foregoing; for example, a finger touch can be used for drawing and a pen touch can be used for manipulating visual elements, explicit modes for creation and manipulation of visual elements can be used, and so forth.

As described in greater detail herein, the presentation system 104 is configured to automatically generate graphical objects by synthesizing example icons supplied by the user 108 in real-time. Additionally or alternatively, the presentation system 104 can enable authoring a prepared presentation, which can thereafter be replayed. Again, the presentation system 104 can support automatic generation of graphical objects by synthesizing example icons supplied by the user 108 when the user 108 creates the prepared presentation.

The presentation system 104 can automatically generate graphical objects (e.g., data charts, maps, etc.) by synthesizing from freeform sketch example icons. This approach can preserve the organic look of sketches and facilitate creating expressive graphical objects (e.g., data charts, maps, etc.) while reducing manual drawing burden. Accordingly, since the user 108 (e.g., presenter) can narrate while the presentation system 104 completes the graphical objects, this reduction in drawing burden can aid narrative communication of the user 108.

As referred to herein, a graphical object can be a data chart, a map, or the like. More particularly, a graphical object as described herein can be a visual element that is automatically created by the presentation system 104 based upon an example icon.

The presentation system 104 can combine the expressive visual language of infographics (information graphics) and dynamic sketch with narrative communication of whiteboard animation. Infographics are graphical representations of information, data, or knowledge. Infographics are commonly used by reporters, computer scientists, statisticians, etc. for communicating conceptual information in a broad range of domains. However, infographics can be costly to create. Whiteboard animation is another visual communication technique, where a presenter commonly narrates and sketches a sequence of line art elements to convey a story. However, creating traditional whiteboard animations can be expensive and labor intensive due to the manual drawing involved therewith.

To enable the user 108 to generate expressive and custom representations that can be aligned with narration, the presentation system 104 can allow the user 108 to sketch a desired representation as an example visual element and can synthesize a graphical object (e.g., a chart, a map, etc.) from the example element. Further, to make storytelling more dynamic and responsive, the presentation system 104 can support interactivity. The presentation system 104 can be designed to fluidly integrate freeform sketching with organic looking data bound visualizations to convey a message or tell a story.

The presentation system 104 can support real-time content creation with fluent animation. To attract attention and create anticipation like various performance art techniques, the presentation system 104 can use a real-time approach to content creation. To reduce the burden of manually drawing the entire graphical object, while aiding narrative communication, the presentation system 104 can complete the graphical object by binding visual elements to the underlying data. Accordingly, the user 108 can narrate while the presentation system 104 automatically completes the graphical object in fluent animation to make it appear as though the user 108 is sketching at a faster speed.

Moreover, contextual information can be provided on a canvas. The presentation system 104 can use the notion of a canvas to present information. Accordingly, viewers can understand the context of an entire story and derive relationships between visual components. The foregoing can be supported by the canvas. The presentation system 104 can support freeform annotation anywhere on the canvas for emphasis, decoration, and text.

According to various embodiments, it is contemplated that the presentation system 104 can be a standalone presentation tool. Additionally or alternatively, in accordance with various embodiments, it is to be appreciated that the presentation system 104 can be a plugin for a disparate presentation tool or include a disparate presentation tool as a plugin.

Figure 2:
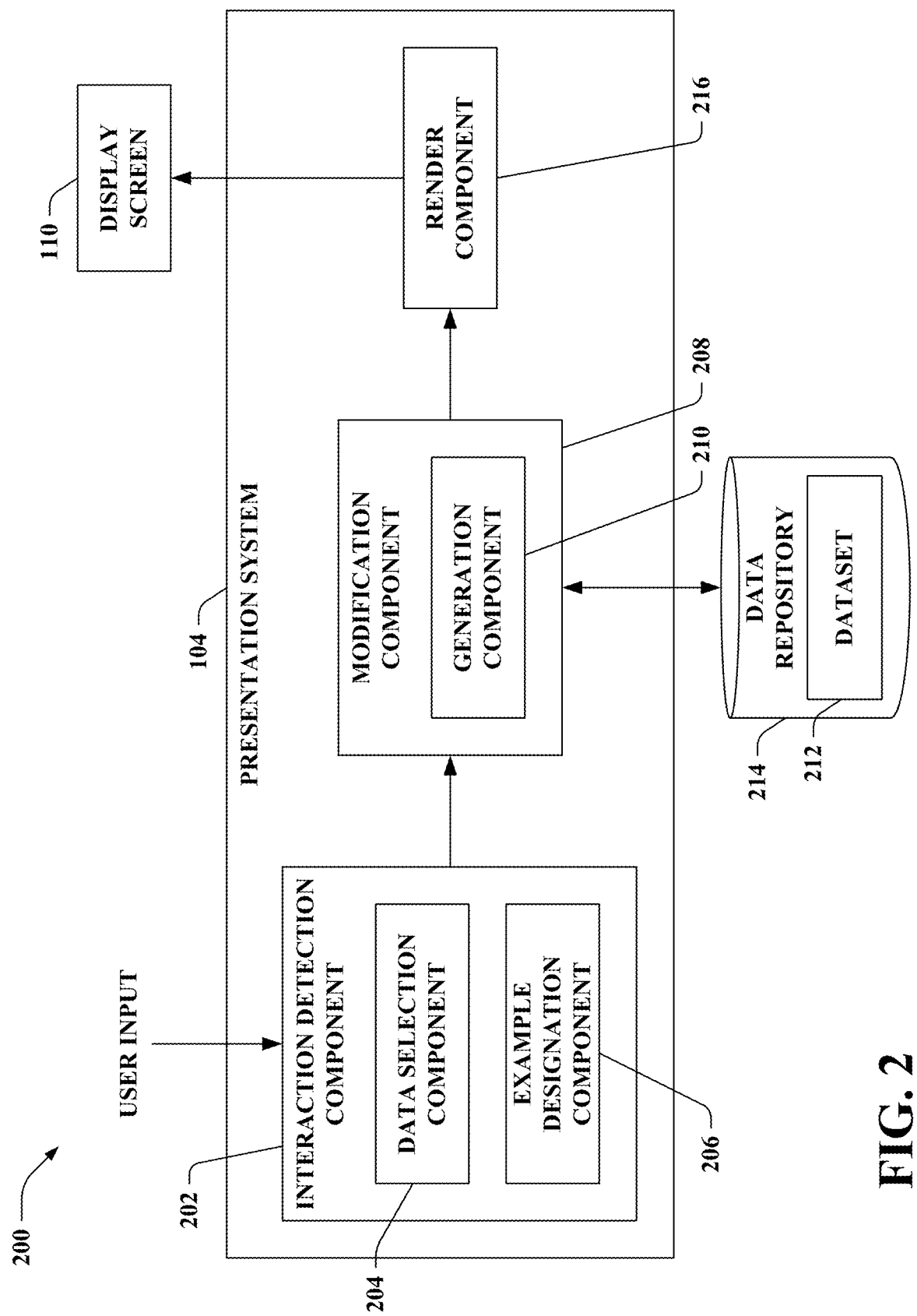
FIG. 2 illustrates a functional block diagram of an exemplary system that facilitates automatically creating graphical objects by synthesizing example icons.

Turning to FIG. 2, illustrated is an exemplary system 200 that facilitates automatically creating graphical objects by synthesizing example icons. The system 200 includes the presentation system 104 and the display screen 110. Moreover, the system 200 includes a data repository 214 that retains a dataset 212. Accordingly, the presentation system 104 can generate a graphical object based upon an example icon and data from the dataset 212 retained in the data repository 214, and such graphical object can be displayed on the display screen 110.

The presentation system 104 includes an interaction detection component 202 that detects user input. For instance, the interaction detection component 202 can receive the user input from the sensor 106 of FIG. 1. According to an example as described above, the interaction detection component 202 can determine whether the user input is a pen touch or a finger touch, position and/or movement of such pen touch or finger touch, and so forth.

The interaction detection component 202 further includes a data selection component 204 that receives, from the user input detected by the interaction detection component 202, an indication that specifies a selected value attribute from the dataset 212 for the graphical object. By way of example, the indication that specifies the selected value attribute from the dataset 212 for the graphical object can be an indication of a selection, effectuated by the user, of a particular value attribute from a data attribute menu displayed on the display screen 110. In accordance with this example, the data attribute menu can include a set of selectable value attributes that can be chosen by the user. By way of another example, the data selection component 204 can automatically recognize the selected value attribute from the dataset 212 for the graphical object. Pursuant to yet a further example, the data selection component 204 can receive substantially any other type of explicit indication that specifies the selected value attribute from the dataset 212 for the graphical object. According to an illustration, the data selection component 204 can read the selected value attribute from the dataset 212 for the graphical object from a pre-recorded file (e.g., during replay). However, it is to be appreciated that the claimed subject matter is not limited to the foregoing examples.

Moreover, the interaction detection component 202 can include an example designation component 206. The example designation component 206 can receive, from the user input detected by the interaction detection component 202, an example icon for the graphical object. The example icon is a cluster of strokes. Moreover, a stroke is a mark that is displayable on the display screen 110. The cluster of strokes of the example icon can be perceived as a single feature. To cluster the strokes for an example icon sketched by the user, the example designation component 206 can merge strokes with overlapping bounds.

The presentation system 104 can include a modification component 208 that can analyze the user input detected by the interaction detection component 202 and modify the user interface generated for display on the display screen 110 based upon such analysis. For instance, the modification component 208 can create and/or manipulate visual elements included in the user interface based upon the analysis of the user input. Moreover, the presentation system 104 can include a render component 216 that can cause the user interface to be displayed on the display screen 110.

The modification component 208 can include a generation component 210 that can generate the graphical object based upon the example icon and data for the selected value attribute from the dataset 212. The graphical object can include instances of the example icon respectively modified based upon the data for the selected value attribute from the dataset 212. Accordingly, the generation component 210 can generate the instances of the example icon that are respectively modified based upon the data from the dataset 212. Further, the data from the dataset 212 can be included in the graphical object with the instances of the example icon; yet, the claimed subject matter is not so limited. Examples of modifications that can be made to the instances of the example icon by the generation component 210 include changing a size, location, number of copies, etc. of the example icon. Moreover, it is contemplated that the example icon can be beautified (e.g., by the generation component 210), for instance. Further, the render component 216 can cause the graphical object generated by the generation component 210 to be displayed on the display screen 110.

The data repository 214 can make the dataset 212 available for manipulation and interaction. Pursuant to various examples, the dataset 212 can be retained on a server or in a distributed database, can be a file on a local client, can be in-memory data, or the like. In yet another example, the data repository 214 can be part of a cloud computing infrastructure.

According to an example, to support generation of graphical objects such as time-based charts and map charts, an attribute included in the dataset 212 can include time information (e.g., year, day, hour, etc.), and another attribute can include geographic information corresponding to a prepared map sketch file. On initialization, the presentation system 104 can read in the dataset 212 and the map sketch file (e.g., or a portion of the map sketch file that corresponds to geographic information included in the dataset 212), and can dynamically generate menu items that can be selected by a user. However, the claimed subject matter is not limited to the foregoing as the time information and/or geographic information need not be included (e.g., a different attribute other than time can be on the X-axis of a data chart, etc.).

As noted above, the example designation component 206 can receive the example icon for the graphical object. In accordance with various exemplary scenarios, the example designation component 206 can receive the example icon for the graphical object by detecting a freeform sketch of the example icon drawn on the display screen 110 (e.g., by the user) using the input apparatus. The example designation component 206, for instance, can cluster strokes of the freeform sketch into the example icon. Pursuant to other exemplary scenarios, it is contemplated that the example designation component 206 can receive the example icon for the graphical object from an example icon library that includes a set of example icons.

Figure 3:
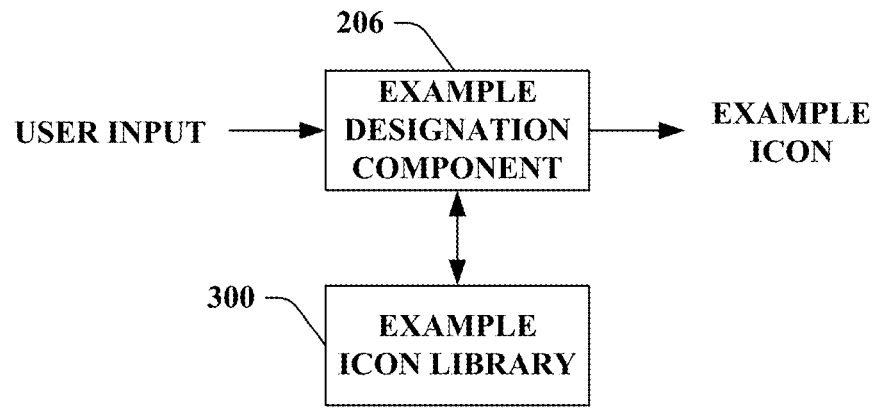
FIGS. 3-4 illustrate various exemplary scenarios pertaining to reception of the example icon for the graphical object.
Figure 4:
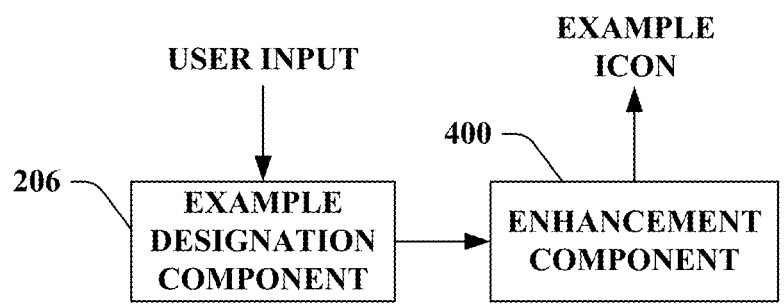

FIGS. 3-4 illustrate various exemplary scenarios pertaining to reception of the example icon for the graphical object. It is to be appreciated, however, that the claimed subject matter is not limited to the exemplary scenarios described in FIGS. 3-4.

Reference is now made to FIG. 3. The example designation component 206 can obtain user input that pertains to selection of the example icon from an example icon library 300. Moreover, the example designation component 206 can retrieve the example icon from the example icon library 300. Following the example set forth in FIG. 3, the example icon library 300 can include previously recorded freeform sketches drawn using an input apparatus (e.g., recorded using an authoring component as described herein). Additionally or alternatively, the example icon library 300 can include predefined example icons from substantially any source. Although not shown in FIG. 3, it is contemplated that the example icon library 300 can be retained in the data repository 214 of FIG. 2.

Reference is now made to FIG. 4. Again, the example designation component 206 can receive user input. More particularly, in the exemplary scenario of FIG. 4, the example designation component 206 can detect a freeform sketch of the example icon drawn on the display screen using the input apparatus. Moreover, an enhancement component 400 can enhance (e.g., beautify, alter, etc.) the example icon drawn on the display screen. It is contemplated that the enhancement component 400 can employ substantially any technique (e.g., non-photorealistic rendering, etc.) to enhance the example icon.

Figure 5:
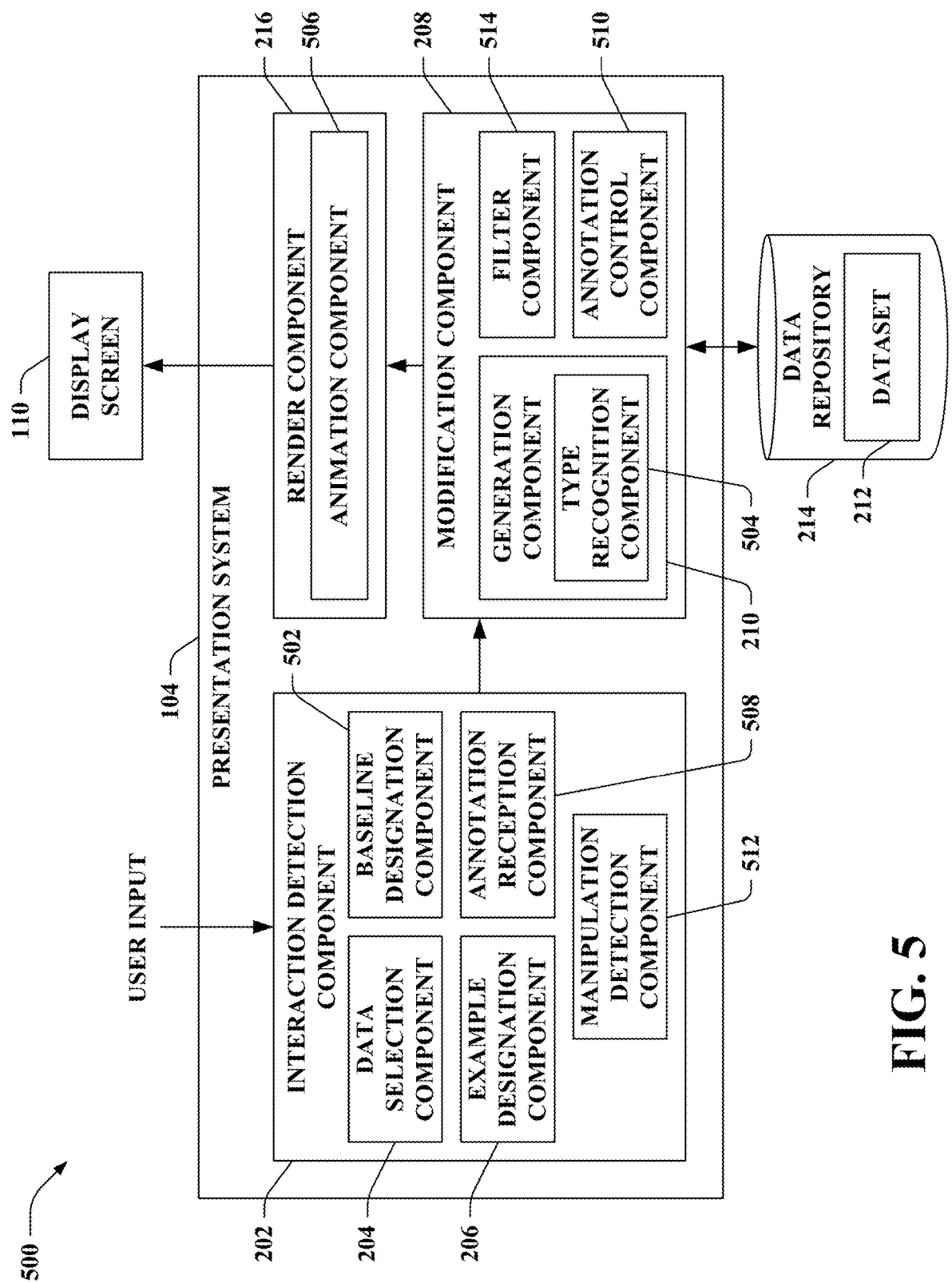
FIG. 5 illustrates a functional block diagram of an exemplary system that enables generating and/or manipulating the graphical object.

Referring to FIG. 5, illustrated is a system 500 that enables generating and/or manipulating the graphical object. The system 500 includes the presentation system 104, the display screen 110, and the data repository 214. As described above, the presentation system 104 further includes the interaction detection component 202, the modification component 208, and the render component 216.

The interaction detection component 202 can include the data selection component 204, the example designation component 206, and a baseline designation component 502. The baseline designation component 502 can receive a baseline for the graphical object drawn on the display screen 110 using the input apparatus. It is to be appreciated that substantially any type of stroke can be utilized as the baseline. For instance, the baseline for the graphical object can be a non-linear stroke drawn on the display screen 110, a linear stroke drawn on the display screen 110, a set of strokes drawn on the display screen 110, and so forth.

Thus, by way of illustration, the data selection component 204 can receive the indication that specifies the selected value attribute from the dataset 212 for the graphical object. Moreover, the example designation component 206 can receive the example icon for the graphical object. The example icon for the graphical object can be displayed on the display screen 110. As described above, the user can draw the example icon on the display screen 110, the example icon can be selected from the example icon library 300, a freeform sketch on the display screen 110 can be enhanced to provide the example icon, a combination thereof, or the like. Further, the baseline designation component 502 can receive the baseline for the graphical object drawn on the display screen 110 using the input apparatus.

As noted above, the modification component 208 can include the generation component 210, which can generate the graphical object. The generation component 210 can further include a type recognition component 504 that can determine a type of the graphical object based upon a property of the example icon and relative positions of the example icon and the baseline. The property of the example icon, for instance, can be whether the example icon is a single-icon or a multi-icon. Moreover, the generation component 210 can generate the graphical object having the type as determined, where the graphical object further includes the baseline.

The type recognition component 504 can support various types of graphical objects. The type of the graphical object determined by the type recognition component 504 can be, for example, a tally chart, a line chart, a bar chart, or a map; however, it is to be appreciated that the claimed subject matter is not so limited as other types are intended to fall within the scope of the hereto appended claims. Moreover, the type recognition component 504 supports dynamically changing the type of the graphical object. By way of example, the interaction detection component 202 can receive user input that specifies changing the graphical object to a second type. Following this example, the type recognition component 504 can dynamically change the graphical object to the second type specified by the user input. In accordance with an illustration, the type recognition component 504 can initially determine the type of the graphical object to be a tally chart. Responsive to user input that specifies changing the graphical object to a bar chart, the type recognition component 504 can cause the generation component 210 to change the graphical object to be a bar chart. However, it is to be appreciated that the claimed subject matter is not limited to the foregoing illustration.

By way of illustration, the type recognition component 504 can employ the following exemplary heuristic to determine the type of the graphical object. The type recognition component 504 can determine the type to be a tally chart if the example icon is a multi-icon example, and such multi-icon example does not intersect with the baseline. Moreover, the type recognition component 504 can determine the type to be a line chart if the example icon is a single-icon example, and such single-icon example does not intersect with baseline. Further, the type recognition component 504 can identify the type to be a bar chart if the example icon is a single-icon example, and such single-icon example intersects with the baseline. Further, the type recognition component 504 can identify the type as being a map if the baseline is rectangular. A bounding box of the stroke can determine the size of the map. In such case, icons can be overlaid on the map where the scale of the icon can represent the underlying data. It is to be appreciated, however, that the claimed subject matter is not limited to the foregoing exemplary heuristic, as other heuristics are intended to fall within the scope of the hereto appended claims. According to other examples, it is further contemplated that the type recognition component 504 can automatically recognize the type of the graphical object, determine the type of the graphical object responsive to sketch gestures (e.g., a bar shape for the bar chart, a line shape for the line chart) or explicit input (e.g., responsive to a click on a button rendered on the display screen 110 that specifies a particular type for the graphical object), or the like.

Moreover, the presentation system 104 can animate stroke creation on the display screen 110. More particularly, the render component 216 can include an animation component 506 that can animate creation of strokes of the instances of the example icon comprised in the graphical object on the display screen 110. For instance, if the example icon includes five strokes that were drawn on the display screen 110 in a particular sequence, then the five strokes can be repeated in the same sequence for each of the instances included in the graphical object. Further, if the graphical object includes six instances of the example icon that includes five strokes, then the five strokes can be repeated in the same sequence for each of the six instances of the example icon (e.g., respectively modified by the generation component 210). It is to be appreciated that the example icons can be drawn simultaneously, in series, and so forth.

Moreover, the animation component 506 can support dynamic animation; thus, depending upon the complexity of the graphical object, the animation component 506 can determine how fast to animate creation of the strokes and/or how much parallel drawing to animate. Such determinations can be made based upon a total stroke length for the graphical object, for example; yet, it is contemplated that the claimed subject matter is not so limited.

The presentation system 104 can further support context aware annotation. For instance, the interaction detection component 202 can include an annotation reception component 508 that can receive a freeform annotation drawn on the display screen 110 using the input apparatus. The modification component 208 can further include an annotation control component 510 that can determine whether the freeform annotation corresponds to the graphical object generated by the generation component 210 (or a disparate graphical object from a set of graphical objects displayed on the display screen 110). When the annotation control component 510 determines that the freeform annotation corresponds to a particular graphical object, then the freeform annotation can be linked with that particular graphical object by the annotation control component 510. The interaction detection component 202 can further include a manipulation detection component 512 that can detect user input that causes manipulation of various aspects of the user interface displayed on the display screen 110. The manipulation detection component 512, for instance, can receive user input that causes manipulation of the graphical object linked with the freeform annotation. Accordingly, the annotation control component 510 can cause the freeform annotation to be manipulated responsive to the graphical object being manipulated.

According to an example, multiple graphical objects can be drawn on a canvas displayed on the display screen 110. Moreover, freeform annotation can be drawn on the display screen 110 by the user. The annotation control component 510 can determine the graphical object to which the freeform annotation corresponds. Accordingly, when the graphical object is moved, the annotation can follow (e.g., be moved along with the graphical object). Further, when the graphical object is resized, the annotation can also be resized. Yet, it is contemplated that the claimed subject matter is not limited to the foregoing examples.

It is contemplated that the modification component 208 can additionally or alternatively alter other aspects of a graphical object responsive to receipt of the user input by the manipulation detection component 512, and thus, the modification component 208 can manage graphical object(s) drawn on the canvas displayed on the display screen 110. Examples of the aspects of a graphical object that can be changed based on the user input include size, location, color, orientation, opacity, type, etc. Moreover, a graphical object can be minimized, reactivated, duplicated, etc. based on the user input. Various types of interactions and/or input modalities can invoke the changes to the graphical object. For example, touch can move and resize the graphical object (or a portion thereof) or a scribble sketch gesture can erase the graphical object (or a portion thereof). Further, voice commands can cause some changes to the graphical object, for example.

Moreover, the modification component 208 can include a filter component 514 that can support dynamic filtering. The manipulation detection component 512 can receive a selection of a visual keyword displayed on the display screen 110. The filter component 514 can filter the data for the selected value attribute from the dataset 212 responsive to the selection of the visual keyword. Moreover, the generation component 210 can update the graphical object by altering one or more of the instances of the example icon based upon the data for the selected value attribute from the dataset 212 as filtered by the filter component 514.

The visual keyword can be a shaped stroke or an icon, for example. For instance, prior to presentation, a user can create a mapping between a stroke and a textual keyword in order to perform dynamic filtering by interacting with the stroke instead of entering the keyword (e.g., using a virtual keyboard). The iconic representation of the keywords can preserve the expressive graphical style of the visuals.

When the user selects a visual keyword by tapping the icon on the display screen 110, the filter component 514 can filter the data from the dataset 212 utilized by the generation component 210 to update the graphical object. Accordingly, when the user selects the visual keyword by tapping the icon, the modification component 208 can update other visual elements according to the textual keyword associated with the selected icon(s). For instance, the selection can be toggled when the user taps the visual keyword; yet, the claimed subject matter is not so limited.

According to an illustration, when the user selects an icon from a first graphical object, other graphical objects displayed on the display screen 110 can automatically be updated by the generation component 210 through dynamic filtering by the filter component 514. By way of another illustration, it is contemplated that the annotation control component 510 can remove annotation when dynamic filtering is applied, and thereafter, can cause the annotation to reappear when the filters are reset. However, the claimed subject matter is not limited to the foregoing illustrations.

Figure 6:
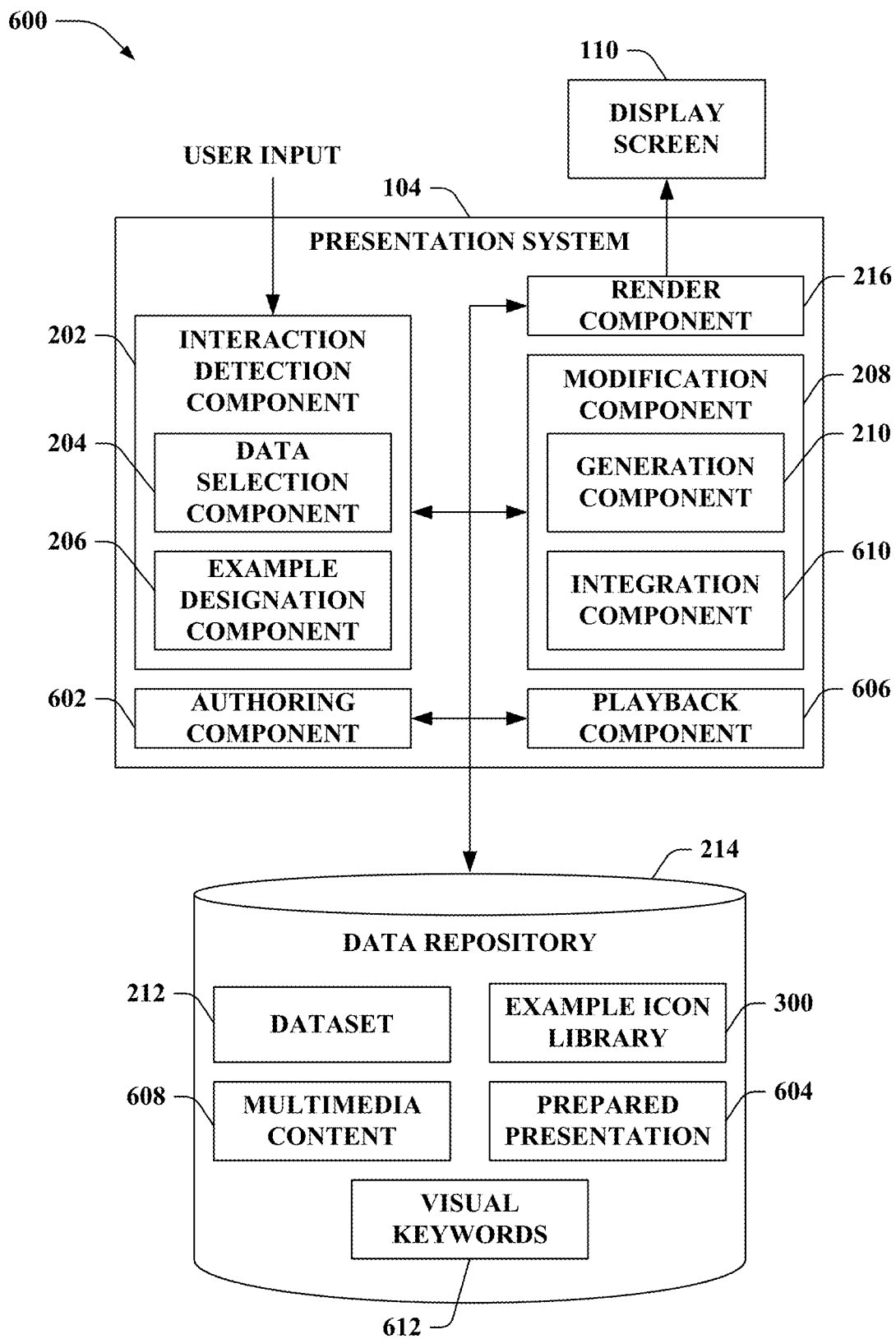
FIG. 6 illustrates a functional block diagram of an exemplary system for preparing presentations and/or playing back prepared presentations.

Now turning to FIG. 6, illustrated is a system 600 for preparing presentations and/or playing back prepared presentations. The system 600 includes the presentation system 104, the display screen 110, and the data repository 214. The presentation system 104 further includes the interaction detection component 202, the modification component 208, and the render component 216 as described herein. The interaction detection component 202 can further include the data selection component 204 and the example designation component 206. Although not shown, it is further contemplated that the interaction detection component 202 can include the baseline designation component 502, the annotation reception component 508, and the manipulation detection component 512. Moreover, the modification component 208 includes the generation component 210. While not shown, it is further contemplated that the modification component 208 can include the annotation control component 510 and the filter component 514. Moreover, the generation component 210 can further include the type recognition component 504. While not shown, it is also to be appreciated that the render component 216 can include the animation component 506.

The presentation system 104 can further include an authoring component 602 that can enable creation of a prepared presentation 604. For instance, the prepared presentation generated by the authoring component 602 can be retained in the data repository 214. Moreover, the presentation system 104 includes a playback component 606 that can replay the prepared presentation 604. During replay of the prepared presentation 604, user input can be received; responsive to the user input received during the replay of the prepared presentation 604, the prepared presentation 604 can be modified.

According to an example, the authoring component 602 can be employed to record sample icons. Such example icon can be retained in the example icon library 300, which can be included in the data repository 214. Thus, as described above in connection with FIG. 3, a recorded sample icon can be selected from the example icon library 300, where the example designation component 206 receives the user input that specifies the selection of the recorded sample icon.

Moreover, the authoring component 602 can record, as part of the prepared presentation 604, creation of strokes of the instances of the example icon included in the graphical object generated by the generation component 210. The authoring component 602 can further record, as part of the prepared presentation 604, multimedia content 608, creation of freeform annotation, creation of disparate strokes of instances of a disparate example icon included in a disparate graphical object, manipulation of the graphical object, manipulation of the freeform annotation, creation of a visual keyword, a combination thereof, and the like. Thus, the authoring component 602 can allow for recording animation described herein.

The playback component 606 can replay the prepared presentation 604 by animating the creation of the strokes of the instances of the example icon comprised in the graphical object on the display screen 110. Moreover, the playback component 606 can animate, on the display screen 110, the multimedia content 608, the creation of the freeform annotation, the creation of the disparate strokes of the disparate example icon comprised in the disparate graphical object, the manipulation of the graphical object, the manipulation of the freeform annotation, a combination thereof, and so forth.

The playback component 606 can provide a playback timeline control for replaying the prepared presentation 604. Thus, the prepared presentation 604 can be a sequence of steps that can be replayed using the playback timeline control. Moreover, when the prepared presentation 604 is replayed by the playback component 606, the modification component 208 can modify the prepared presentation 604 in response to user input detected by the interaction detection component 202. For example, the prepared presentation 604 can be annotated during playback, dynamical filtering can be utilized to manipulate one or more graphical objects replayed during playback, and so forth. Further, it is contemplated that additional graphical object(s) can be generated as described herein during playback.

The playback component 606 can replay the prepared presentation 604 as recorded. Additionally or alternatively, the prepared presentation 604 can be altered during replay by the playback component 606. For instance, the sequence of steps can be recorded by the authoring component 602 as noted above. Further, the steps in the sequence can be executed in order during replay, additional step(s) can be added into the sequence during replay, step(s) can be removed from the sequence during replay, and/or step(s) of the sequence can be modified during replay. Moreover, replay of the prepared presentation 604 can transition to live creation of the presentation by the user (e.g., upon the prepared presentation 604 ending, responsive to explicit user input, responsive to non-selection of a next step in the sequence, etc.) and/or live creation of a presentation can transition to replay of the prepared presentation 604.

The authoring component 602 can record or save a sequence of steps as the prepared presentation 604. By way of illustration, the sequence of steps can pertain to creation of a bar chart with a first example icon followed by creation of a line chart with a second example icon. The playback component 606 can replay the sequence of steps. During playback, creation of the bar chart with the first icon can be animated on the display screen 110. However, the user may decide to override the second icon saved as part of the prepared presentation 604 during playback of the prepared presentation 604. Thus, the user can draw a third example icon in real-time, which can have priority over the second icon saved as part of the prepared presentation 604; accordingly, the line chart can be created based on the third example icon drawn in real-time (e.g., replacing steps related to creation of the second example icon with steps related to creation of the third example icon). Further following this illustration, after creation of the line chart during playback, the line chart can be changed to a tally chart during playback. It is to be appreciated, however, that the claimed subject matter is not limited to the foregoing exemplary illustration.

According to another illustration, it is contemplated that a default graphical object (e.g., a default chart) can be drawn when the user does not provide an example icon (e.g., either saved in the prepared presentation 604 or drawn in real-time). Thus, if an example icon is neither included in the prepared presentation 604 played back by the playback component 606 nor drawn in real-time, then a default icon can be utilized. Further, the graphical object can be generated based upon the default icon.

The modification component 208 can further include an integration component 610 that can integrate the multimedia content 608 into the prepared presentation 604. The multimedia content, for example, can be an image, a video, or the like; yet, it is contemplated that the claimed subject matter is not so limited.

Moreover, the authoring component 602 can be employed to create visual keywords 612, where the visual keywords 612 can be employed as described above in the context of dynamic filtering. The visual keywords 612 can be retained in the data repository 214.

According to an example, the prepared presentation 604 recorded by the authoring component 602 can be preserved as a video. Following this example, the video can be distributed, retained (e.g., in the data repository 214), replayed without modification, and so forth.

FIGS. 7-16 depict an exemplary sequence of user interfaces of a presentation generated by the presentation system 104 described herein. The example presentation is described as being created in real-time; however, it is contemplated that portions of such presentation can be created in advance utilizing the authoring component 602 as described above. The presentation described in FIGS. 7-16 pertains to a sample story about global energy consumption between 1980 and 2005. The underlying dataset includes five columns (e.g., content, year, energy consumption, population, and per-person energy consumption) with 36 rows in total (e.g., six continents, six time points per continent). Further, it can be assumed that a user is a presenter who is telling a story about energy consumption around the world.

Figure 7:
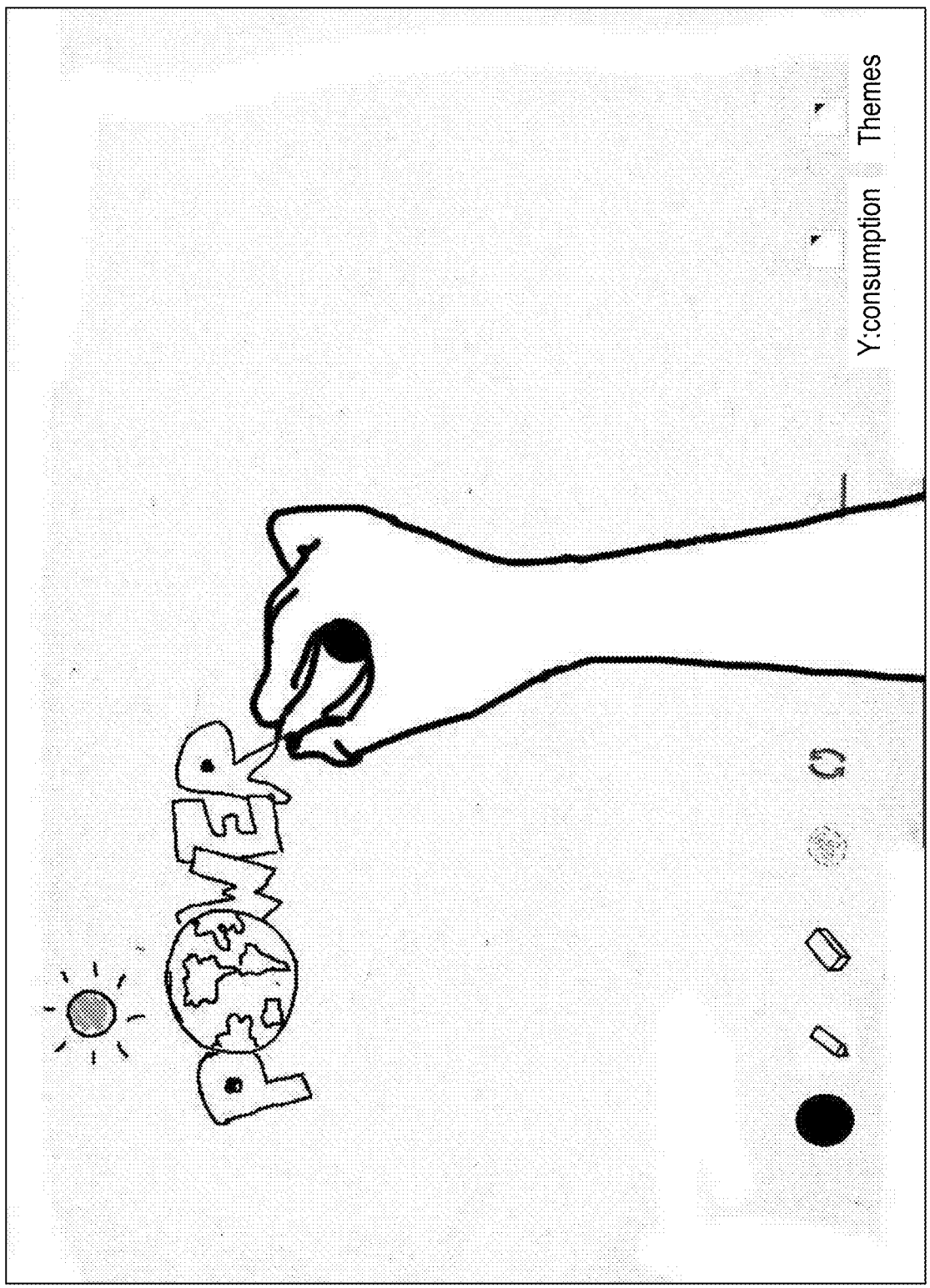
FIGS. 7-16 illustrate an exemplary sequence of user interfaces of a presentation generated by a presentation system as described herein.

As illustrated in FIG. 7, the user begins by sketching the sun and the word "power" with a globe in it (e.g., using a pen) to convey that his presentation is about global energy consumption. To show how total energy consumption has changed over time, the user can generate a graphical object that pertains to such energy consumption.

Creation of a graphical object can include a series of steps. For instance, the user can select a desired value attribute (e.g., numerical data for the Y-axis of a data chart) from a data attribute menu. A currently selected data attribute, for instance, can be shown on a menu bar. Thereafter, the user can switch to an example icon mode and can sketch one or more example icons. Then, the user can switch to a chart axis mode and can draw the baseline for the desired graphical object. According to another example (not shown), rather than employing the foregoing three modal steps for creation of graphical objects, sketch recognition can be employed; yet, the claimed subject matter is not so limited.

Figure 8:
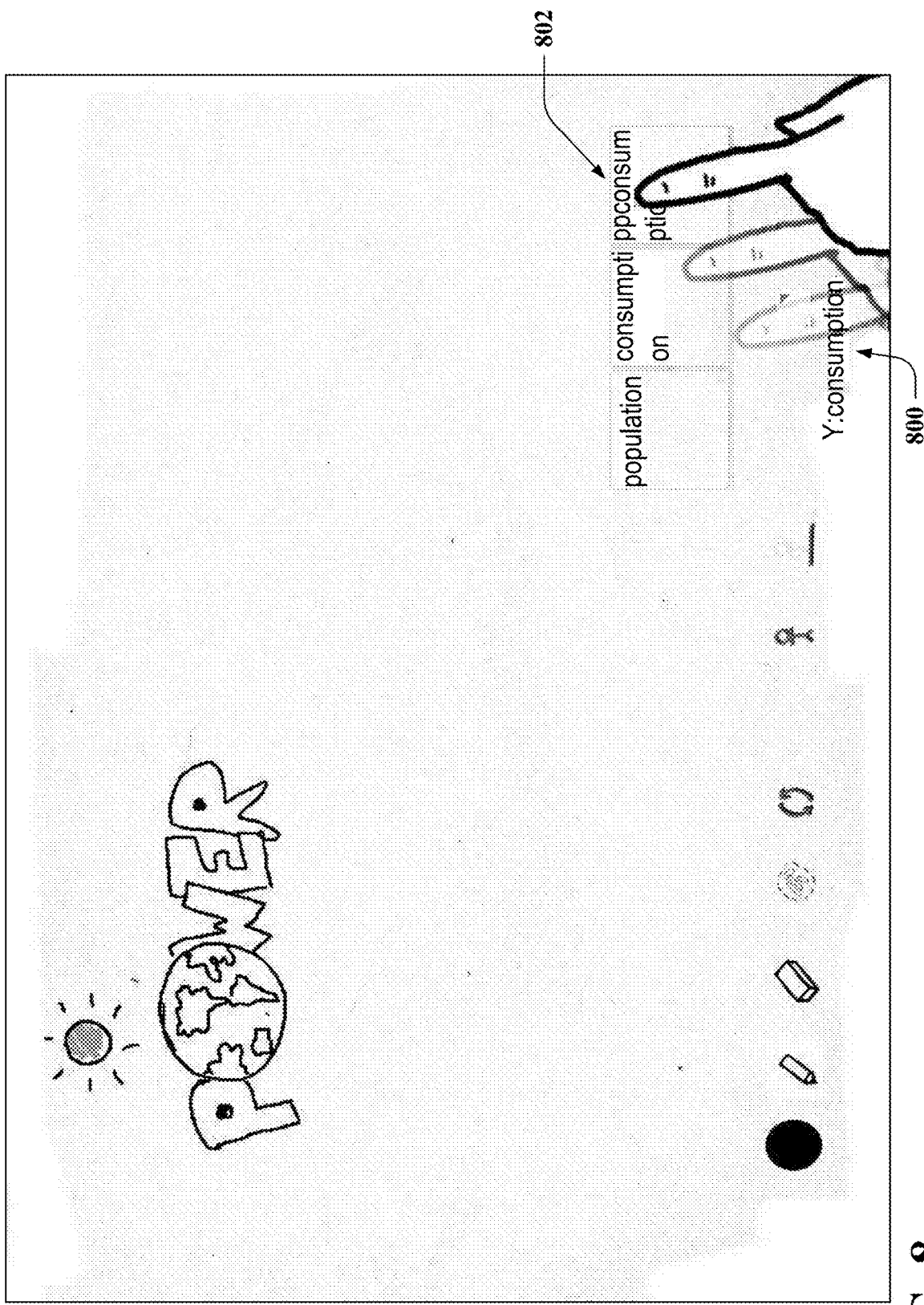
Figure 9:
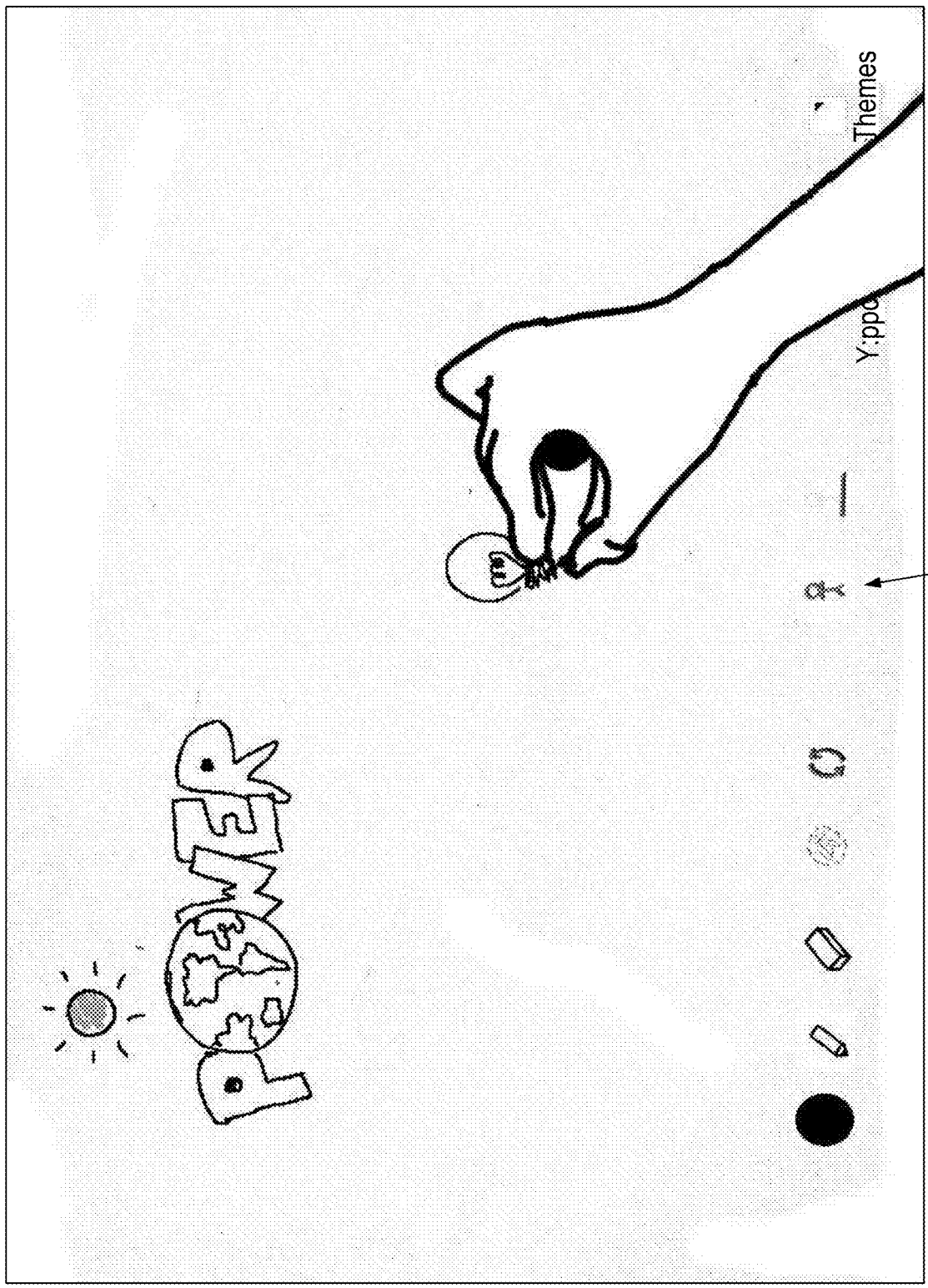
Figure 10:
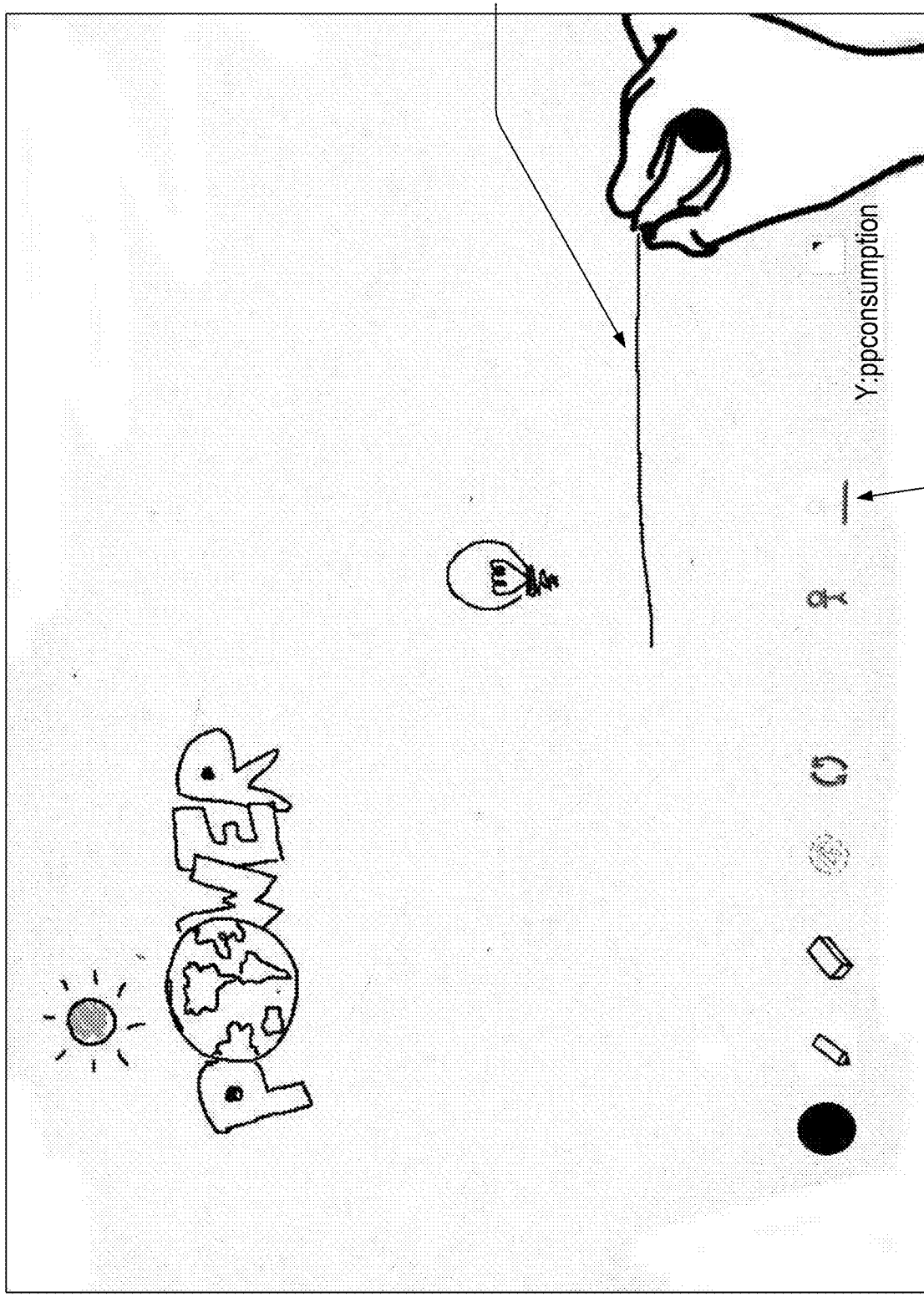
Figure 11:
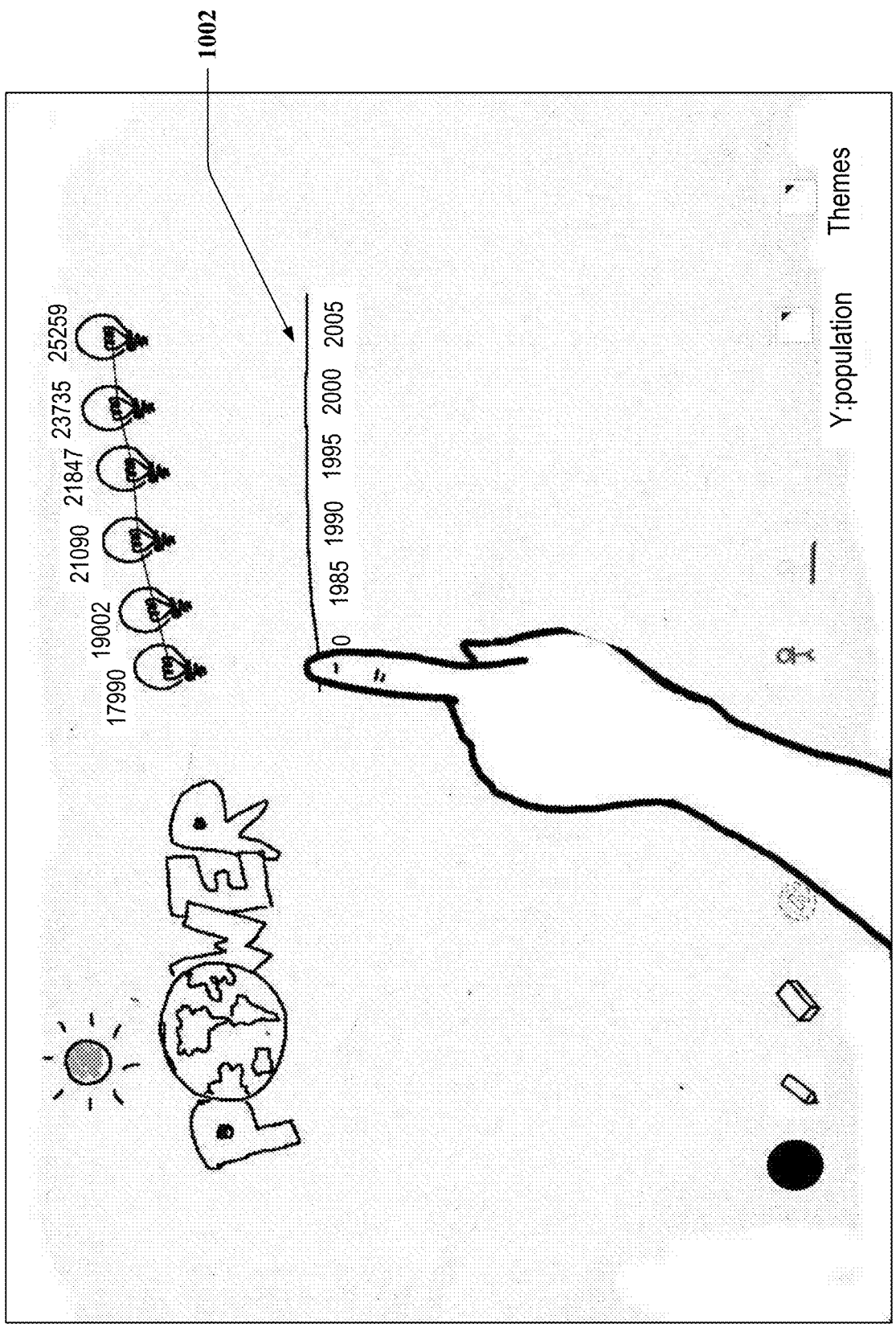
Figure 12:
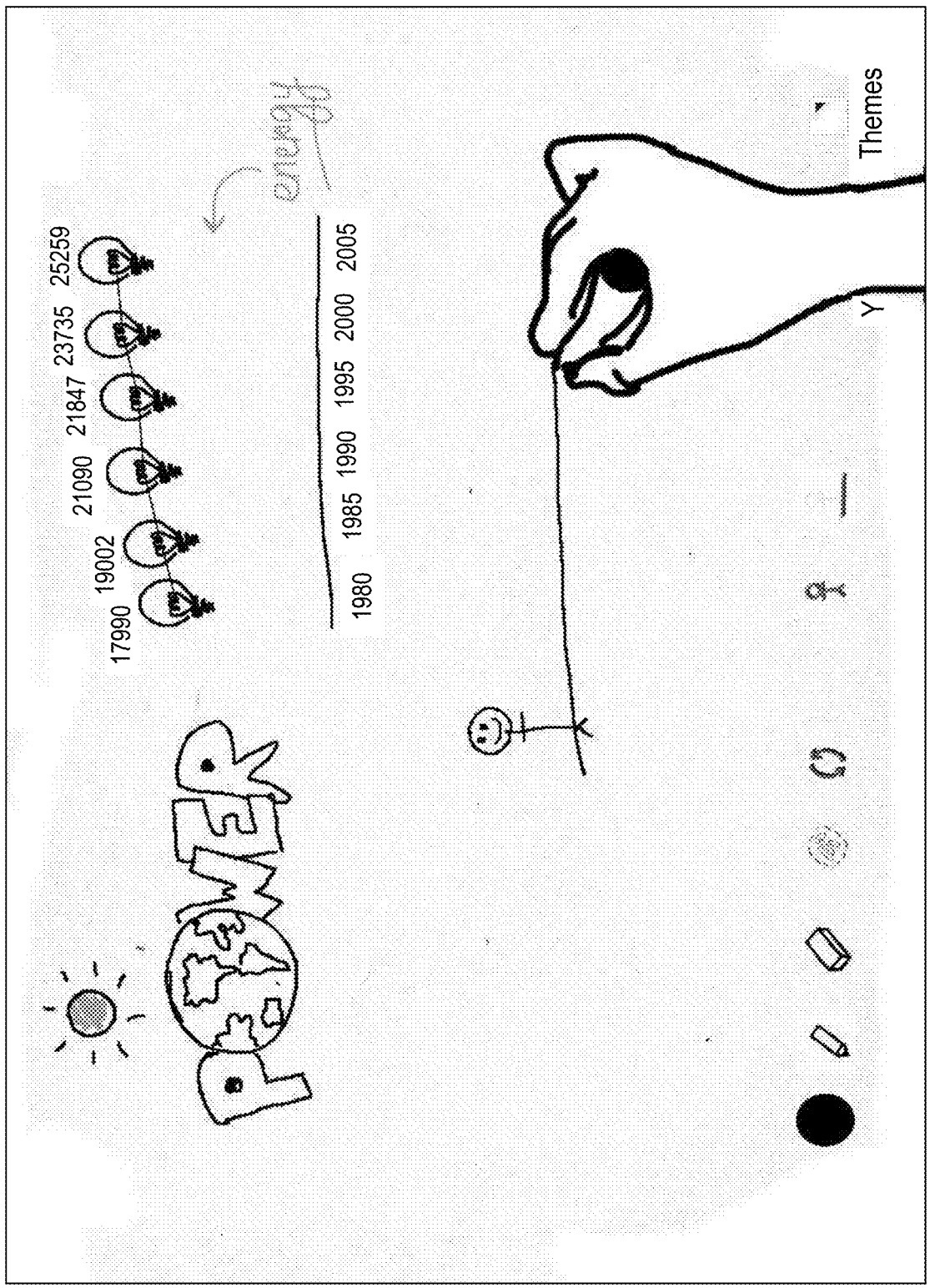

The above-noted steps to create the graphical object are shown in FIGS. 8-11. More particularly, as depicted in FIG. 8, a data attribute button 800 from a menu bar can be selected by the user, which causes a data attribute menu to be displayed. Then, the user can select an energy consumption button 802 from the data attribute menu. Turning to FIG. 9, the user can select the example icon button 900 from the menu bar. Thereafter, the user can draw a light bulb shape as an example icon using the pen. The user can then select a chart axis button 1000 as shown in FIG. 10. Moreover, the user can draw a baseline 1002 for a line chart using the pen. The presentation system (e.g., the presentation system 104) can automatically complete the sketch as a line chart with the example icon by placing additional instances of the example icon with appropriate relative offsets to the baseline 1002 based on the time and consumption quantities included in the underlying dataset. Moreover, FIG. 11 shows that the graphical object, namely the line chart, can be moved to the top right corner of the user interface responsive to user input effectuated by the finger of the user. The user can add an annotation "energy" with an arrow to the line chart (e.g., as shown in FIG. 12).

Figure 13:
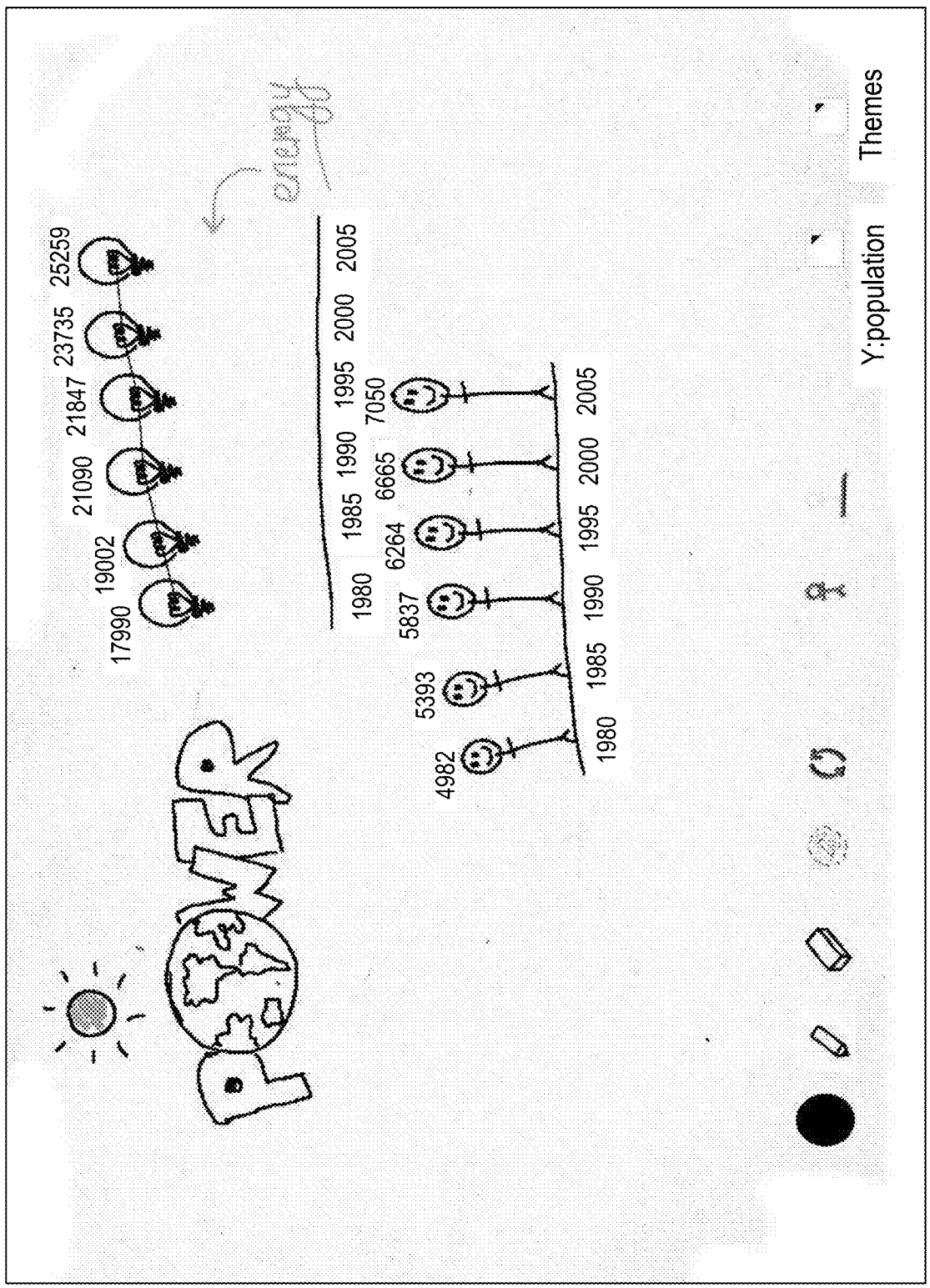
Figure 14:
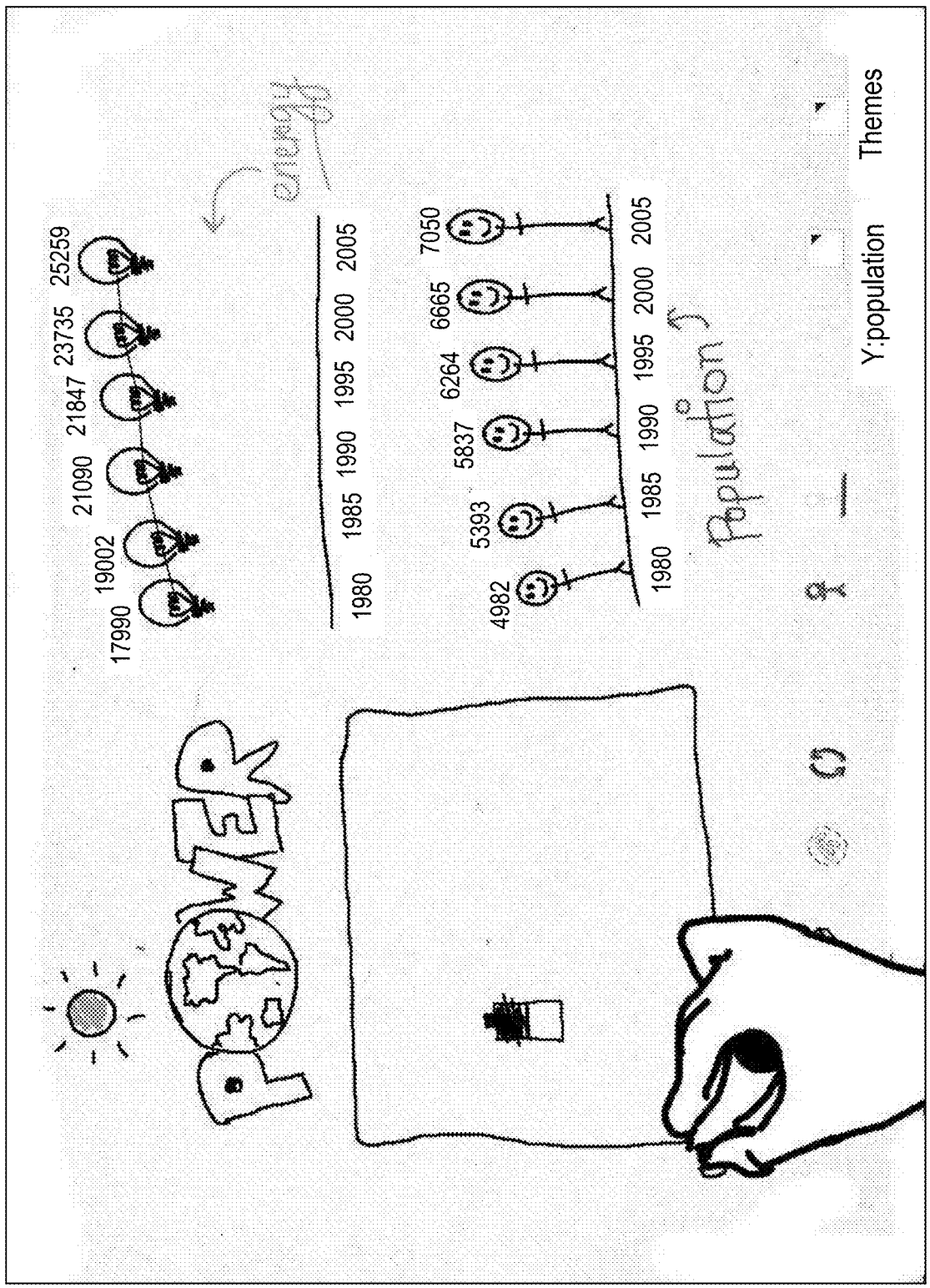

The user can further desire to illustrate how the population has changed over the same timeframe. Thus, the user can select the population attribute from the data attribute menu as described above. In a similar process to that above, the user can select the example icon button, draw a stick figure as an example icon, select the chart axis button, and sketch the baseline for the chart as shown in FIG. 12. Hence, the presentation system can complete the chart as a bar chart by vertically stretching the additional icons proportionally to the underlying data values as shown in FIG. 13. To secure more sketching space and to align the charts with the existing line chart, the user can move the bar chart to the right and annotate it with the word "population" as shown in FIG. 14. Moreover, the user can resize or minimize the bar chart, if needed, to provide more sketching space.

Figure 15:
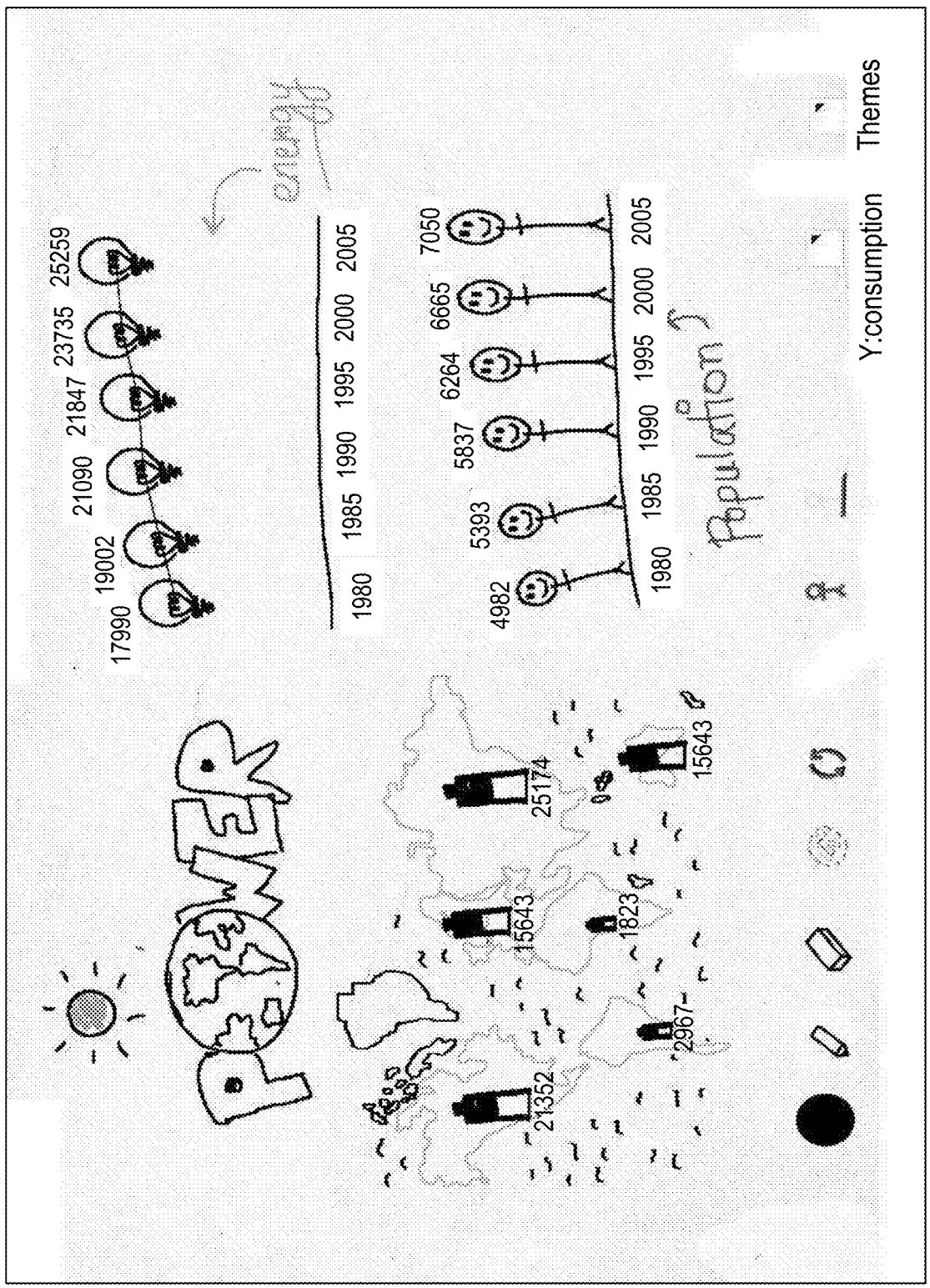
Figure 16:
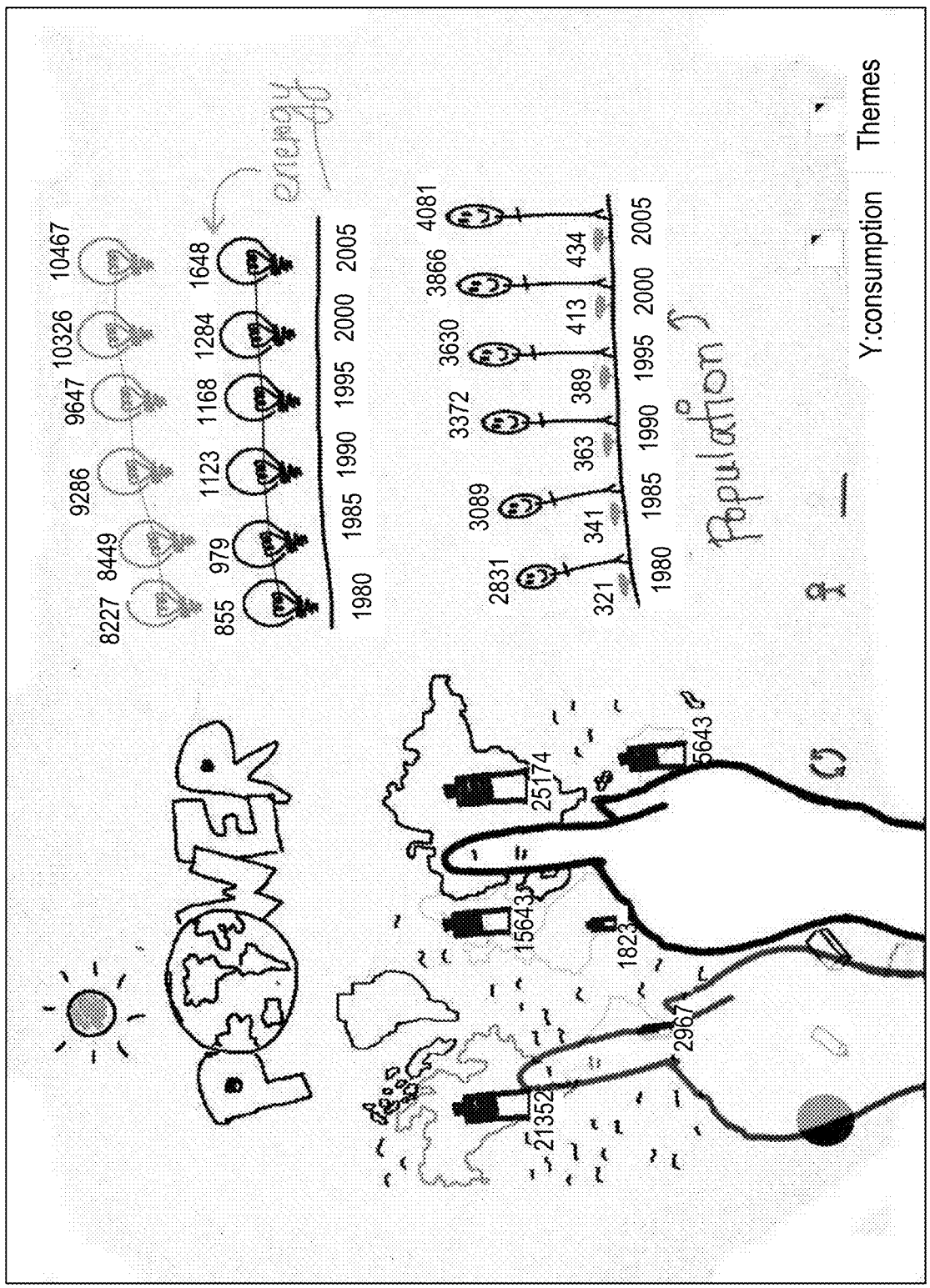

The user can now desire to show how energy consumption differs geographically. Accordingly, the user can select the energy consumption attribute from the data attribute menu. Thereafter, the user can select the example icon button, draw a battery icon as an example icon, select the chart axis button, and draw a rectangle to indicate a size and location of a map as shown in FIG. 14. The presentation system can complete the sketch as a map, scaling the example icon by the underlying data quantity for each region and placing each icon geographically as shown in FIG. 15.

To compare the trends of individual energy consumption and population between North America and Asia, the user can tap North America and Asia on the map. The presentation system can filter the underlying data to those two continents, and can update the other charts accordingly. As shown, the bar chart and the line chart can be updated to depict data for North America and Asia.

Figure 17:
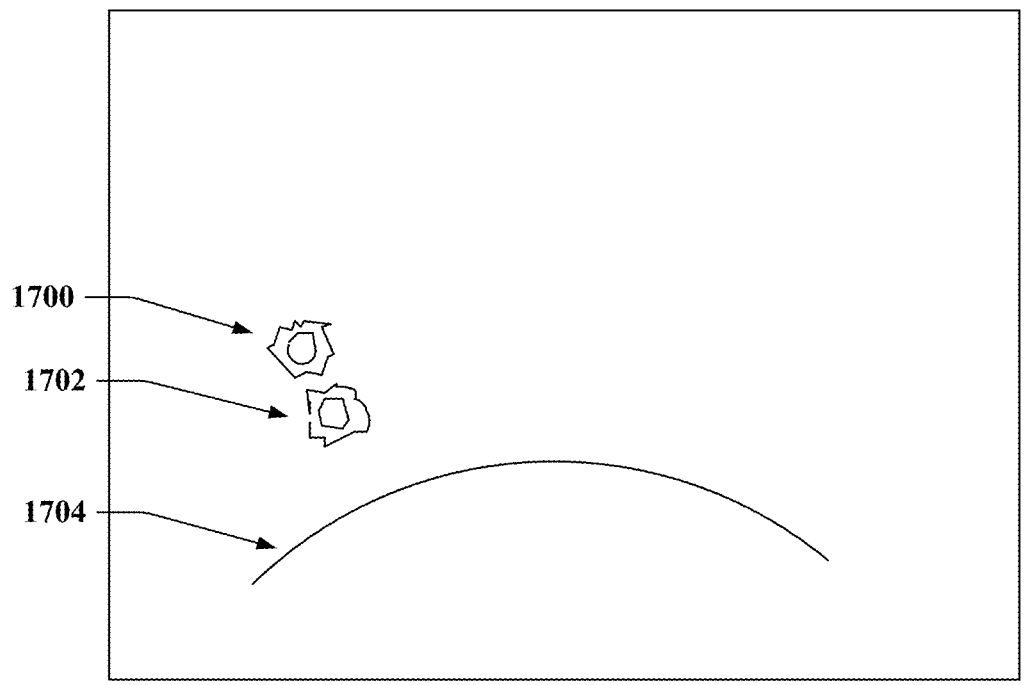
FIGS. 17-18 illustrate another exemplary sequence of user interfaces of a presentation generated by the presentation system as described herein.
Figure 18:
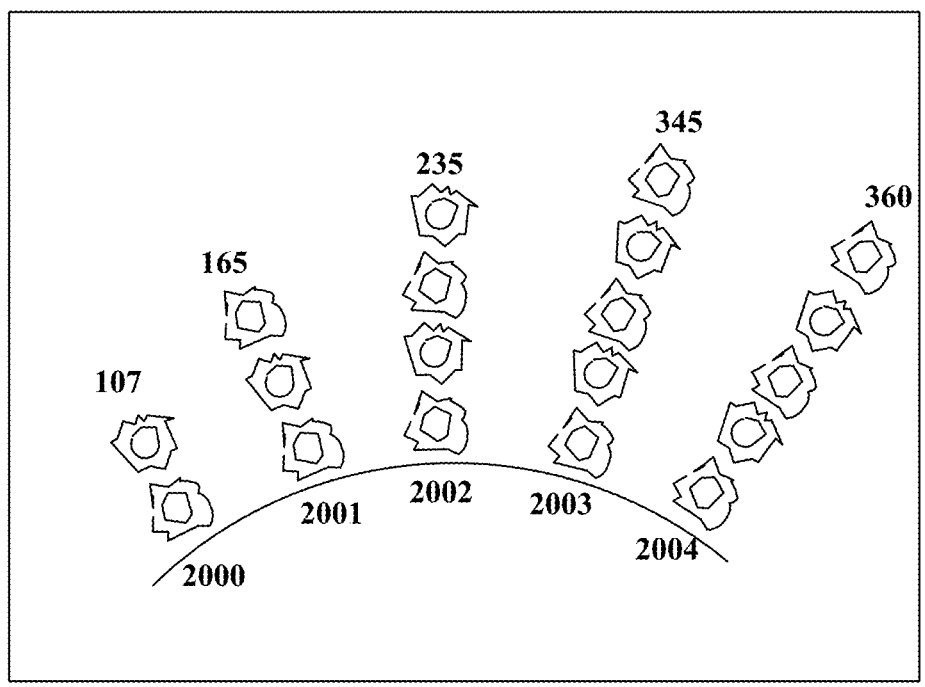

FIGS. 17-18 illustrate another exemplary sequence of user interfaces of a presentation generated by the presentation system 104 described herein. Again, however, the claimed subject matter is not limited to such example. FIG. 17 depicts a user interface that includes an example icon drawn by the user. More particularly, the example icon included in the user interface of FIG. 17 is a multi-icon since strokes of the example icon can be clustered into two icons, namely, an icon 1700 and an icon 1702. Moreover, the user interface of FIG. 17 includes a curved baseline 1704. As described herein, a baseline can be substantially any shape. As depicted in FIG. 18, the presentation system can generate a tally chart based on the example icon 1700, the example icon 1702, and the baseline 1704 shown in FIG. 17 and cause such tally chart to be displayed.

Figure 19:
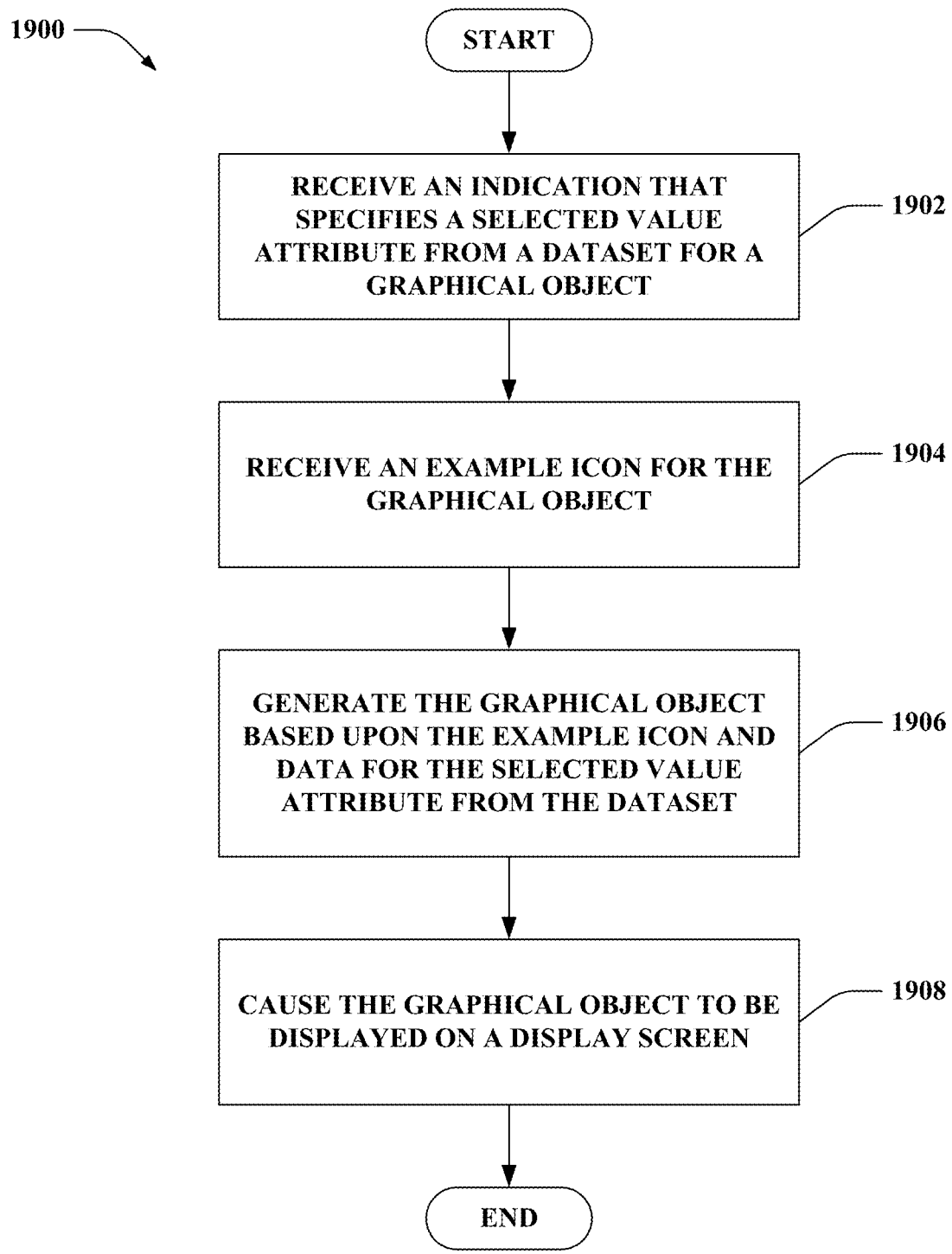
FIG. 19 is a flow diagram that illustrates an exemplary methodology of presenting a graphical object on a display screen.
Figure 20:
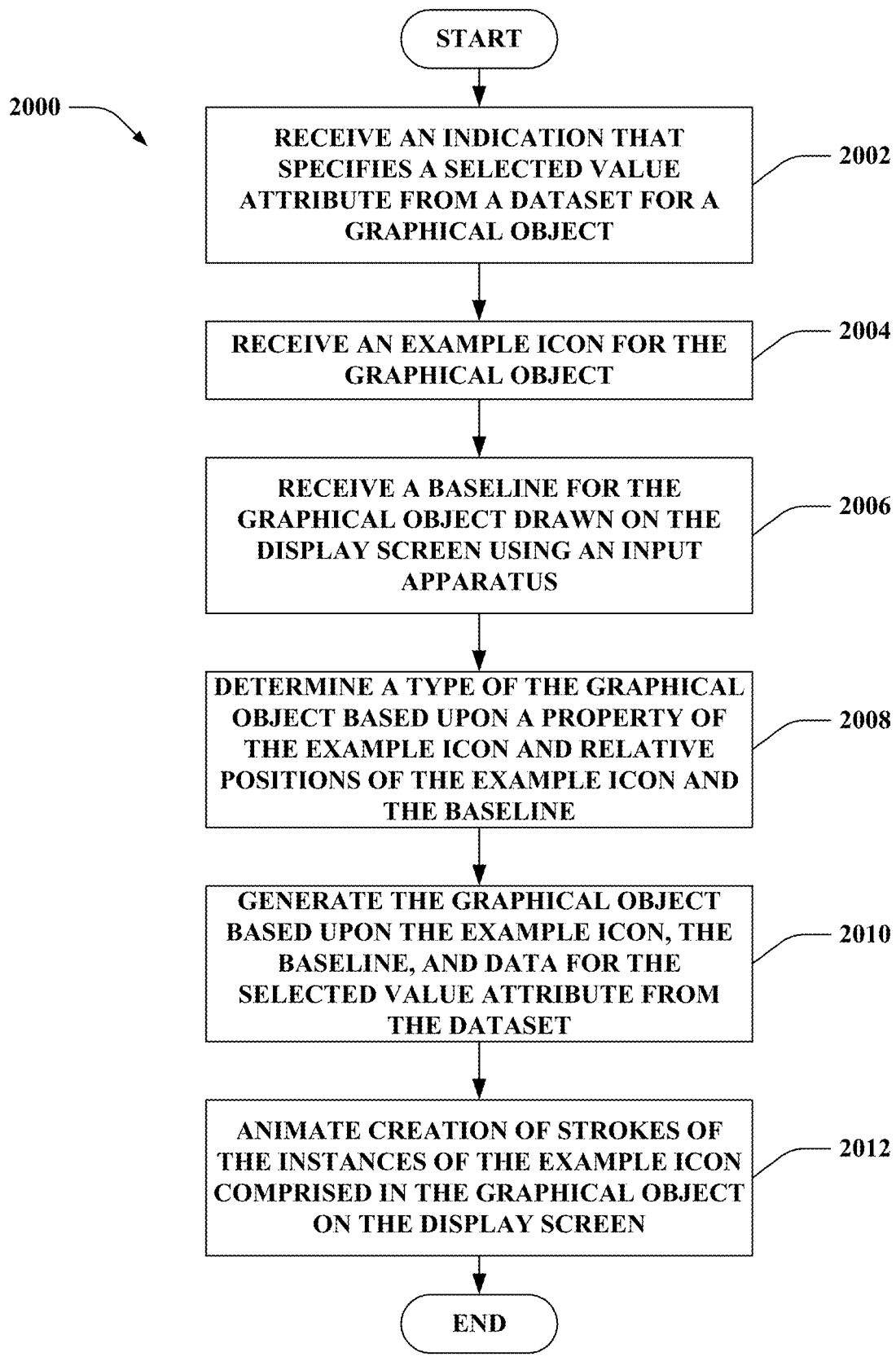
FIG. 20 is a flow diagram that illustrates an exemplary methodology of presenting a graphical object on a display screen.

FIGS. 19-20 illustrate exemplary methodologies pertaining to generating a presentation that includes graphical object(s). While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 19 illustrates a methodology 1900 of presenting a graphical object on a display screen. At 1902, an indication that specifies a selected value attribute from a dataset for the graphical object can be received. At 1904, an example icon for the graphical object can be received. The example icon can be a cluster of strokes. Moreover, a stroke can be a mark that is displayable on the display screen. At 1906, the graphical object can be generated based upon the example icon and data for the selected value attribute from the dataset. The graphical object can include instances of the example icon respectively modified based upon the data for the selected value attribute from the dataset. At 1908, the graphical object can be caused to be displayed on the display screen.

Referring now to FIG. 20, illustrated is a methodology 2000 of presenting a graphical object on a display screen. At 2002, an indication that specifies a selected value attribute from a dataset for the graphical object can be received. At 2004, an example icon for the graphical object can be received. At 2006, a baseline for the graphical object drawn on the display screen using an input apparatus can be received. At 2008, a type of the graphical object can be determined based upon a property of the example icon and relative positions of the example icon and the baseline. The property of the example icon, for instance, can be whether the example icon is a single-icon or a multi-icon. At 2010, the graphical object can be generated based upon the example icon, the baseline, and data for the selected value attribute from the dataset. The graphical object can include instances of the example icon respectively modified based upon the data for the selected value attribute from the dataset and the baseline. Moreover, the graphical object can be of the type as determined. At 2012, creation of strokes of the instances of the example icon comprised in the graphical object can be animated on the display screen.

Figure 21:
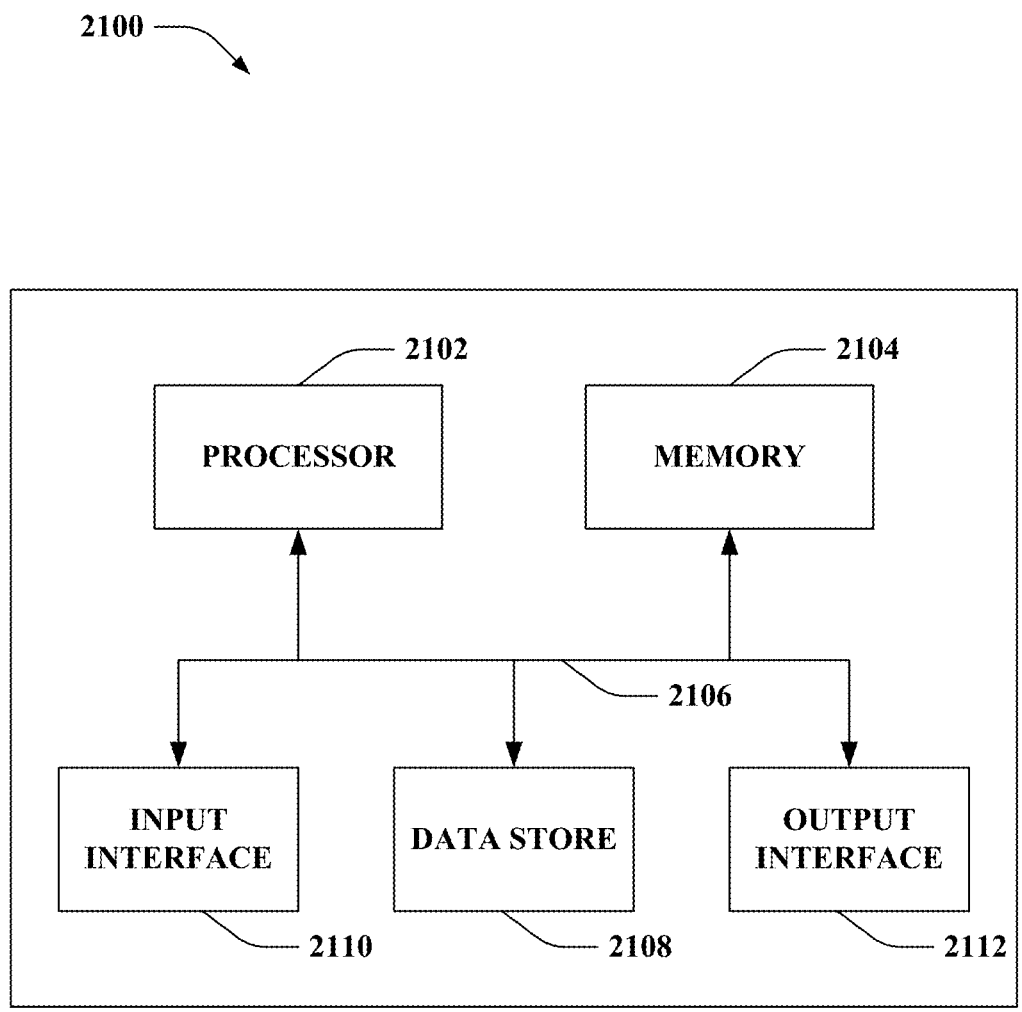
FIG. 21 illustrates an exemplary computing device.

Referring now to FIG. 21, a high-level illustration of an exemplary computing device 2100 that can be used in accordance with the systems and methodologies disclosed herein is illustrated. For instance, the computing device 2100 may be used in a system that generates a graphical object for a presentation based upon an example icon. By way of another example, the computing device 2100 may be used in a system that records and/or plays back such a presentation. The computing device 2100 includes at least one processor 2102 that executes instructions that are stored in a memory 2104. The instructions may be, for instance, instructions for implementing functionality described as being carried out by one or more components discussed above or instructions for implementing one or more of the methods described above. The processor 2102 may access the memory 2104 by way of a system bus 2106. In addition to storing executable instructions, the memory 2104 may also store dataset(s), an example icon library, multimedia content(s), prepared presentation(s), visual keyword(s), and so forth.

The computing device 2100 additionally includes a data store 2108 that is accessible by the processor 2102 by way of the system bus 2106. The data store 2108 may include executable instructions, dataset(s), an example icon library, multimedia content(s), prepared presentation(s), visual keyword(s), etc. The computing device 2100 also includes an input interface 2110 that allows external devices to communicate with the computing device 2100. For instance, the input interface 2110 may be used to receive instructions from an external computer device, from a user, etc. The computing device 2100 also includes an output interface 2112 that interfaces the computing device 2100 with one or more external devices. For example, the computing device 2100 may display text, images, etc. by way of the output interface 2112.

It is contemplated that the external devices that communicate with the computing device 2100 via the input interface 2110 and the output interface 2112 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 2100 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 2100 may be a distributed system. Thus, for instance, several devices may be in communication by way of a network connection and may collectively perform tasks described as being performed by the computing device 2100.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of presenting a freeform sketch-based graphical object on a display screen, comprising:
   receiving an indication that specifies a selected value attribute from a dataset for the freeform sketch-based graphical object, wherein the selected value attribute specifies data values from the dataset;
   receiving a freeform sketch example icon for the freeform sketch-based graphical object, wherein the freeform sketch example icon is a cluster of strokes drawn in a sequence, and wherein a stroke is a mark that is displayable on the display screen; and
   generating the freeform sketch-based graphical object based upon the freeform sketch example icon and the data values specified by the selected value attribute from the dataset, wherein the freeform sketch-based graphical object is generated by incorporating a plurality of instances of the freeform sketch example icon in the freeform sketch-based graphical object based upon the freeform sketch example icon as received, wherein sizes of the instances of the freeform sketch example icon are respectively modified based upon the data values specified by the selected value attribute from the dataset such that the sizes of the instances of the freeform sketch example icon incorporated in the freeform sketch-based graphical object represent the data values, and wherein the sizes of the instances of the freeform sketch example icon are modified in one dimension and are unmodified in a second dimension.

2. The method of claim 1, wherein receiving the freeform sketch example icon for the freeform sketch-based graphical object further comprises detecting drawing of the freeform sketch example icon on the display screen using an input apparatus, and wherein the freeform sketch example icon drawn on the display screen is one of the instances of the freeform sketch example icon incorporated in the freeform sketch-based graphical object.

3. The method of claim 1, wherein receiving the freeform sketch example icon for the freeform sketch-based graphical object further comprises:
   obtaining user input that pertains to selection of the freeform sketch example icon from an example icon library; and
   retrieving the freeform sketch example icon from the example icon library.

4. The method of claim 3, wherein the example icon library comprises previously recorded freeform sketch example icons drawn using an input apparatus.

5. The method of claim 1, wherein the freeform sketch example icon for the freeform sketch-based graphical object is displayed on the display screen, the method further comprising:
   subsequent to receiving the freeform sketch example icon and while the freeform sketch example icon is displayed on the display screen, detecting drawing of a baseline for the freeform sketch-based graphical object on the display screen, wherein the baseline comprises at least one stroke drawn on the display screen using an input apparatus;
   determining a type of the freeform sketch-based graphical object based upon a property of the freeform sketch example icon and relative positions of the freeform sketch example icon and the baseline; and
   generating the freeform sketch-based graphical object being the type as determined, wherein the freeform sketch-based graphical object further comprises the baseline, and wherein the instances of the freeform sketch example icon are positioned relative to the baseline as drawn in the freeform sketch-based graphical object based upon the data values specified by the selected value attribute from the dataset.

6. The method of claim 5, further comprising:
   receiving user input that specifies changing the freeform sketch-based graphical object to a second type; and
   dynamically changing the freeform sketch-based graphical object to be the second type specified by the user input.

7. The method of claim 5, wherein the at least one stroke of the baseline for the freeform sketch-based graphical object comprises a non-linear stroke drawn on the display screen, wherein the freeform sketch-based graphical object displayed on the display screen comprises the non-linear stroke, and wherein the instances of the freeform sketch example icon are positioned relative to the non-linear stroke in the freeform sketch-based graphical object.

8. The method of claim 1, further comprising authoring a prepared presentation, wherein authoring the prepared presentation further comprises:
recording, as part of the prepared presentation, the creation of the sequence of the strokes of the instances of the freeform sketch example icon comprised in the freeform sketch-based graphical object; and
recording, as part of the prepared presentation, at least one of multimedia content, creation of freeform annotation, creation of disparate strokes of a disparate freeform sketch example icon comprised in a disparate freeform sketch-based graphical object, manipulation of the freeform sketch-based graphical object, manipulation of the freeform annotation, or creation of a visual keyword.

9. The method of claim 8, further comprising replaying the prepared presentation by animating the creation of the sequence of the strokes of the instances of the freeform sketch example icon comprised in the freeform sketch-based graphical object and the at least one of the multimedia content, the creation of the freeform annotation, the creation of the disparate strokes of the disparate freeform sketch example icon comprised in the disparate freeform sketch-based graphical object, the manipulation of the freeform sketch-based graphical object, or the manipulation of the freeform annotation.

10. The method of claim 8, further comprising:
replaying the prepared presentation;
receiving user input during replay of the prepared presentation; and
modifying the prepared presentation in response to the user input during the replay of the prepared presentation.

11. The method of claim 1, further comprising:
receiving a freeform annotation drawn on the display screen using an input apparatus;
determining whether the freeform annotation corresponds to the freeform sketch-based graphical object; and
when the freeform annotation is determined to correspond to the freeform sketch-based graphical object:
linking the freeform annotation with the freeform sketch-based graphical object;
and
manipulating the freeform annotation responsive to the freeform sketch-based graphical object being manipulated.

12. The method of claim 1, further comprising:
receiving a selection of a visual keyword displayed on the display screen;
filtering the data values specified by the selected value attribute from the dataset responsive to the selection of the visual keyword; and
updating the freeform sketch-based graphical object by altering one or more of the instances of the freeform sketch example icon based upon the data values specified by the selected value attribute from the dataset as filtered.

13. The method of claim 1, further comprising:
animating creation of a sequence of strokes of the instances of the freeform sketch example icon comprised in the freeform sketch-based graphical object for display on the display screen, wherein the sequence of the strokes of the instances of the freeform sketch example icon comprised in the freeform sketch-based graphical object is based on the sequence in which the strokes are drawn in the freeform sketch example icon as received.

14. The method of claim 1, wherein the sizes of the instances of the freeform sketch example icon are modified in the one dimension and unmodified in the second dimension based on a type of the freeform sketch-based graphical object, and wherein the type of the freeform sketch-based graphical object is based on a property of the freeform sketch example icon and relative positions of the freeform sketch example icon and a baseline.

15. A computing device, comprising:
at least one processor; and
memory that comprises computer-executable instructions that, when executed by the at least one processor, cause the at least one processor to perform acts including:
receiving user input that specifies a selected value attribute from a dataset for a freeform sketch-based graphical object, wherein the selected value attribute specifies data values from the dataset;
receiving a freeform sketch example icon for the freeform sketch-based graphical object, wherein the freeform sketch example icon is a cluster of strokes drawn in a sequence, and wherein a stroke is a mark that is displayable on a display screen; and
generating the freeform sketch-based graphical object based upon the freeform sketch example icon and the data values specified by the selected value attribute from the dataset, the freeform sketch-based graphical object being generated by incorporating a plurality of instances of the freeform sketch example icon as part of the freeform sketch- based graphical object based upon the freeform sketch example icon as received, and sizes of the instances of the freeform sketch example icon being respectively modified based upon the data values specified by the selected value attribute from the dataset such that the sizes of the instances of the freeform sketch example icon incorporated in the freeform sketch-based graphical object represent the data values, wherein the sizes of the instances of the freeform sketch example icon are modified in a first dimension and are unmodified in a second dimension.

16. The computing device of claim 15, the memory further comprising computer-executable instructions that, when executed by the at least one processor, cause the at least one processor to perform acts including:
detecting drawing of a baseline for the freeform sketch-based graphical object while the freeform sketch example icon is displayed on the display screen, wherein the baseline comprises at least one freeform stroke; and
positioning the instances of the freeform sketch example icon relative to the baseline as drawn in the freeform sketch-based graphical object based upon the data values specified by the selected value attributed from the dataset.

17. The computing device of claim 15, the memory further comprising computer-executable instructions that, when executed by the at least one processor, cause the at least one processor to perform acts including:
recording, as part of a prepared presentation, the creation of the sequence of strokes of the instances of the freeform sketch example icon comprised in the freeform sketch based graphical object.

18. The computing device of claim 15, wherein the sizes of the instances of the freeform sketch example icon are modified in the first dimension and unmodified in the second dimension based on a type of the freeform sketch-based graphical object, and wherein the type of the freeform sketch-based graphical object is based on a property of the freeform sketch example icon and relative positions of the freeform sketch example icon and a baseline.

19. The computing device of claim 17, the memory further comprising computer-executable instructions that, when executed by the at least one processor, cause the at least one processor to perform acts including:
replaying, from the prepared presentation, the creation of the sequence of the strokes of the instances of the freeform sketch example icon comprised in the freeform sketch-based graphical object.

20. A computer-readable storage medium including computer-executable instructions that, when executed by a processor, cause the processor to perform acts including:
receiving an indication that specifies a selected value attribute from a dataset for a freeform sketch-based graphical object, wherein the selected value attribute specifies data values from the dataset;
receiving a freeform sketch example icon for the freeform sketch-based graphical object, wherein the freeform sketch example icon is a cluster of strokes drawn in a sequence, and wherein a stroke is a mark that is displayable on a display screen;
causing the freeform sketch example icon to be displayed on the display screen;
subsequent to receiving the freeform sketch example icon for the freeform sketch-based graphical object and while the freeform sketch example icon is displayed on the display screen, receiving a baseline for the freeform sketch-based graphical object, wherein the baseline comprises at least one stroke drawn on the display screen using an input apparatus;
determining a type of the freeform sketch-based graphical object based upon a property of the freeform sketch example icon and relative positions of the freeform sketch example icon and the baseline; and
generating the freeform sketch-based graphical object based upon the freeform sketch example icon, the baseline, and the data values specified by the selected value attribute from the dataset, wherein the freeform sketch-based graphical object is generated by including a plurality of instances of the freeform sketch example icon in the freeform sketch-based graphical object based upon the freeform sketch example icon as received, wherein sizes of the instances of the freeform sketch example icon are respectively modified based upon the data values specified by the selected value attribute from the dataset such that the sizes of the instances of the freeform sketch example icon incorporated in the freeform sketch-based graphical object represent the data values, wherein the sizes of the instances of the freeform sketch example icon are modified in one dimension and unmodified in a second dimension based upon the type of the freeform sketch-based graphical object, and wherein the instances of the freeform sketch example icon are positioned relative to the baseline in the freeform sketch-based graphical object.

* * * * *